United States Patent
Shiraishi

(10) Patent No.: US 8,238,028 B2
(45) Date of Patent: *Aug. 7, 2012

(54) ERECT EQUAL-MAGNIFICATION LENS ARRAY, SCANNING OPTICAL SYSTEM, EXPOSING OPTICAL SYSTEM AND IMAGE FORMING APPARATUS

(75) Inventor: Takashi Shiraishi, Kanagawa-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 296 days.

This patent is subject to a terminal disclaimer.

(21) Appl. No.: 12/573,602

(22) Filed: Oct. 5, 2009

(65) Prior Publication Data

US 2010/0085646 A1 Apr. 8, 2010

Related U.S. Application Data

(60) Provisional application No. 61/103,041, filed on Oct. 6, 2008.

(51) Int. Cl.
*G02B 27/10* (2006.01)
(52) U.S. Cl. ......... 359/622; 359/619; 359/621; 347/238
(58) Field of Classification Search ............... 359/619, 359/621–623, 626; 347/233, 237, 238, 244; 257/233, 432, 436
See application file for complete search history.

(56) References Cited

U.S. PATENT DOCUMENTS

| | | | | |
|---|---|---|---|---|
| 6,449,099 B2* | 9/2002 | Fujimoto et al. | | 359/621 |
| 6,646,807 B2* | 11/2003 | Yoshikawa et al. | | 359/619 |
| 6,707,613 B2* | 3/2004 | Fujimoto et al. | | 359/622 |
| 7,564,496 B2* | 7/2009 | Wolterink et al. | | 348/340 |
| 7,835,082 B2* | 11/2010 | Tsujino et al. | | 359/622 |
| 7,936,516 B2* | 5/2011 | Nagata | | 359/621 |
| 7,986,460 B2* | 7/2011 | Shiraishi | | 359/619 |
| 2011/0216419 A1* | 9/2011 | Shiraishi | | 359/622 |

FOREIGN PATENT DOCUMENTS

JP 2004-70268 A 3/2004

* cited by examiner

*Primary Examiner* — Loha Ben
(74) *Attorney, Agent, or Firm* — Patterson & Sheridan, LLP

(57) ABSTRACT

An erect equal-magnification lens array according to the present invention includes: a first lens array plate including a first lens plate and a group of plural convex lenses arrayed on an emission surface of the first lens plate, an incident surface of the first lens plate being formed in a planar shape; a first aperture plate having plural apertures; a second lens array plate including a second lens plate and a group of plural convex lenses arrayed on both an incident surface and an emission surface of the second lens plate; a second aperture plate including plural apertures corresponding to plural projections of the plural convex lenses on the emission surface of the second lens plate; and a third lens array plate including a third lens plate and a group of plural convex lenses arrayed on an incident surface of the third lens plate.

18 Claims, 20 Drawing Sheets

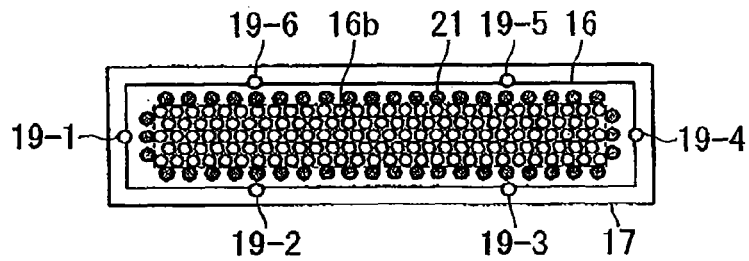
FIG. 3A
FIG. 3B
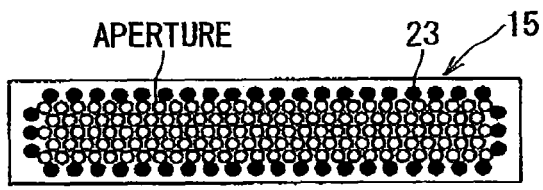
FIG. 3C
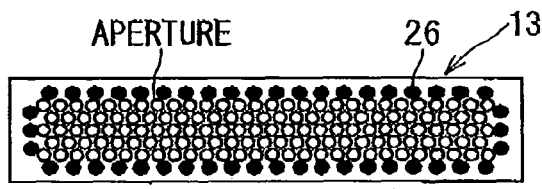
FIG. 3G
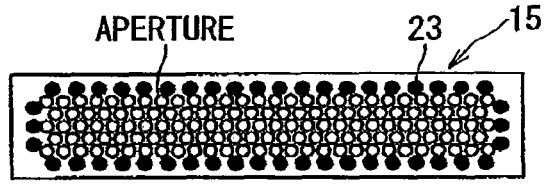
FIG. 3D
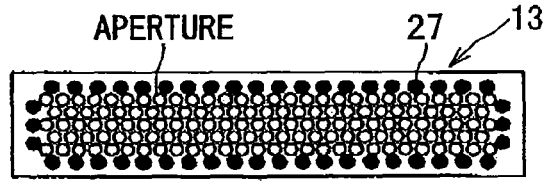
FIG. 3H
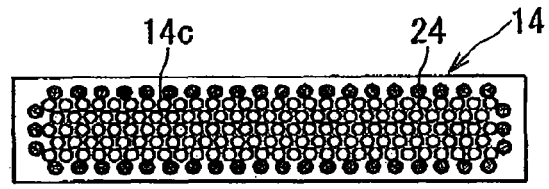
FIG. 3E
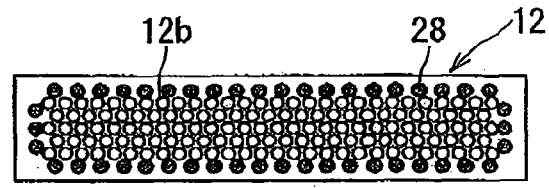
FIG. 3I
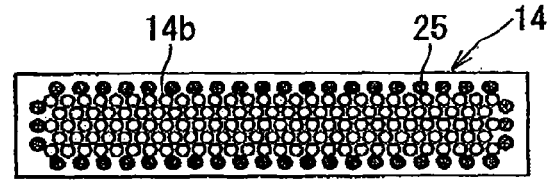
FIG. 3F

ERECT EQUAL-MAGNIFICATION LENS ARRAY, SCANNING OPTICAL SYSTEM, EXPOSING OPTICAL SYSTEM AND IMAGE FORMING APPARATUS

CROSS-REFERENCE TO RELATED APPLICATION

This application is based upon and claims the benefit of priority from: U.S. provisional application 61/103,041, filed on Oct. 6, 2008, the entire contents of each of which are incorporated herein by reference.

TECHNICAL FIELD

The present invention relates to an erect equal-magnification lens array, a scanning optical system, an exposing optical system, and an image forming apparatus, and, more particularly to an erect equal-magnification lens array, a scanning optical system, an exposing optical system, and an image forming apparatus that can prevent occurrence of stray light.

BACKGROUND

An erect equal-magnification lens array is formed by superimposing plural flat lens plates, on both sides of which a large number of convex lenses are arrayed, one on top of another. Specifically, the erect equal-magnification lens array is formed by superimposing plural resin lens plates, in which a large number of convex lenses are arrayed on both sides of a transparent substrate, one on top of another.

As technique concerning the erect equal-magnification lens array, JP-A-2004-70268 is known. According to the technique proposed in JP-A-2004-70268, in an erect equal-magnification lens array formed by superimposing plural lens plates, on both sides of which convex lenses are arrayed and formed, one on top of another, a lens pitch P in an arraying direction of the convex lenses is twice or more as large as the height of a reversed image formed in the erect equal-magnification lens array. Aperture stops are provided in respective lens elements in order to prevent beams from passing through a position where the reversed image is formed except circles having the height of the reversed image as a radius. This makes it possible to reduce occurrence of stray light and flare light.

However, the technique proposed in JP-A-2004-70268 cannot completely prevent the occurrence of stray light and flare light although the technique can reduce the occurrence of stray light and flare light. Stray light that should not originally be made incident on adjacent lens arrays is made incident on the adjacent lens arrays to deteriorate an MTF (Modulation Transfer Function). To reduce the stray light itself, it is necessary to insert aperture stops having required thickness on an incident surface side of the lenses. However, since a part of light made obliquely incident on the incident surface side of the lenses is blocked, an amount of light made incident on the lens array is reduced.

SUMMARY

The present invention has been devised in view of such circumstances and it is an object of the present invention to provide an erect equal-magnification lens array, a scanning optical system, an exposing optical system, and an image forming apparatus that can suitably prevent occurrence of stray light.

In order to solve the problems, an erect equal-magnification lens array according to an aspect of the present invention includes: a first lens array plate including a first lens plate and a group of plural convex lenses arrayed on an emission surface of the first lens plate from which a beam is emitted, an incident surface of the first lens plate on which the beam is made incident being formed in a planar shape; a first aperture plate having plural apertures corresponding to plural projections of the plural convex lenses of the first lens array plate; a second lens array plate including a second lens plate and a group of plural convex lenses arrayed on both an incident surface of the second lens plate on which a beam is made incident and an emission surface of the second lens plate from which the beam is emitted; a second aperture plate including plural apertures corresponding to plural projections of the plural convex lenses on the emission surface of the second lens plate from which the beam is emitted; and a third lens array plate including a third lens plate and a group of plural convex lenses arrayed on an incident surface of the third lens plate on which a beam is made incident.

In order to solve the problems, a scanning optical system according to another aspect of the present invention is a scanning optical system including an erect equal-magnification lens array, wherein the erect equal-magnification lens array includes: a first lens array plate including a first lens plate and a group of plural convex lenses arrayed on an emission surface of the first lens plate from which a beam is emitted, an incident surface of the first lens plate on which the beam is made incident being formed in a planar shape; a first aperture plate having plural apertures corresponding to plural projections of the plural convex lenses of the first lens array plate; a second lens array plate including a second lens plate and a group of plural convex lenses arrayed on both an incident surface of the second lens plate on which a beam is made incident and an emission surface of the second lens plate from which the beam is emitted; a second aperture plate including plural apertures corresponding to plural projections of the plural convex lenses on the emission surface of the second lens plate from which the beam is emitted; and a third lens array plate including a third lens plate and a group of plural convex lenses arrayed on an incident surface of the third lens plate on which a beam is made incident.

In order to solve the problems, an exposing optical system according to still another aspect of the present invention is an exposing optical system including an erect equal-magnification lens array, wherein the erect equal-magnification lens array includes: a first lens array plate including a first lens plate and a group of plural convex lenses arrayed on an emission surface of the first lens plate from which a beam is emitted, an incident surface of the first lens plate on which the beam is made incident being formed in a planar shape; a first aperture plate having plural apertures corresponding to plural projections of the plural convex lenses of the first lens array plate; a second lens array plate including a second lens plate and a group of plural convex lenses arrayed on both an incident surface of the second lens plate on which a beam is made incident and an emission surface of the second lens plate from which the beam is emitted; a second aperture plate including plural apertures corresponding to plural projections of the plural convex lenses on the emission surface of the second lens plate from which the beam is emitted; and a third lens array plate including a third lens plate and a group of plural convex lenses arrayed on an incident surface of the third lens plate on which a beam is made incident.

In order to solve the problems, an image forming apparatus according to still another aspect of the present invention is an image forming apparatus including an erect equal-magnification lens array, wherein the erect equal-magnification lens array includes: a first lens array plate including a first lens plate and a group of plural convex lenses arrayed on an emission surface of the first lens plate from which a beam is emitted, an incident surface of the first lens plate on which the beam is made incident being formed in a planar shape; a first aperture plate having plural apertures corresponding to plural projections of the plural convex lenses of the first lens array plate; a second lens array plate including a second lens plate and a group of plural convex lenses arrayed on both an incident surface of the second lens plate on which a beam is made incident and an emission surface of the second lens plate from which the beam is emitted; a second aperture plate including plural apertures corresponding to plural projections of the plural convex lenses on the emission surface of the second lens plate from which the beam is emitted; and a third lens array plate including a third lens plate and a group of plural convex lenses arrayed on an incident surface of the third lens plate on which a beam is made incident.

DESCRIPTION OF THE DRAWINGS

In the accompanying drawings:

FIG. 3A is a plan view of the erect equal-magnification lens array shown in FIG. 1 viewed from a direction of an arrow P in which the plural components are positioned after being superimposed one on top of another;

FIG. 3B is a side view of the erect equal-magnification lens array in which the plural components are positioned after being superimposed one on top of another;

FIG. 3C is a diagram of a surface of a second aperture plate set in contact with a-third lens array plate;

FIG. 3D is a diagram of a surface of the second aperture plate set in contact with a second lens array plate;

FIG. 3E is a diagram of a surface of the second lens array plate set in contact with the second aperture plate;

FIG. 3F is a diagram of a surface of the second lens array plate set in contact with a first aperture plate;

FIG. 3G is a diagram of a surface of the first aperture plate set in contact with the second lens array plate;

FIG. 3H is a diagram of a surface of the first aperture plate set in contact with a first lens array plate;

FIG. 3I is a diagram of a surface of the first lens array plate set in contact with the first aperture plate;

DETAILED DESCRIPTION

Figure 1:
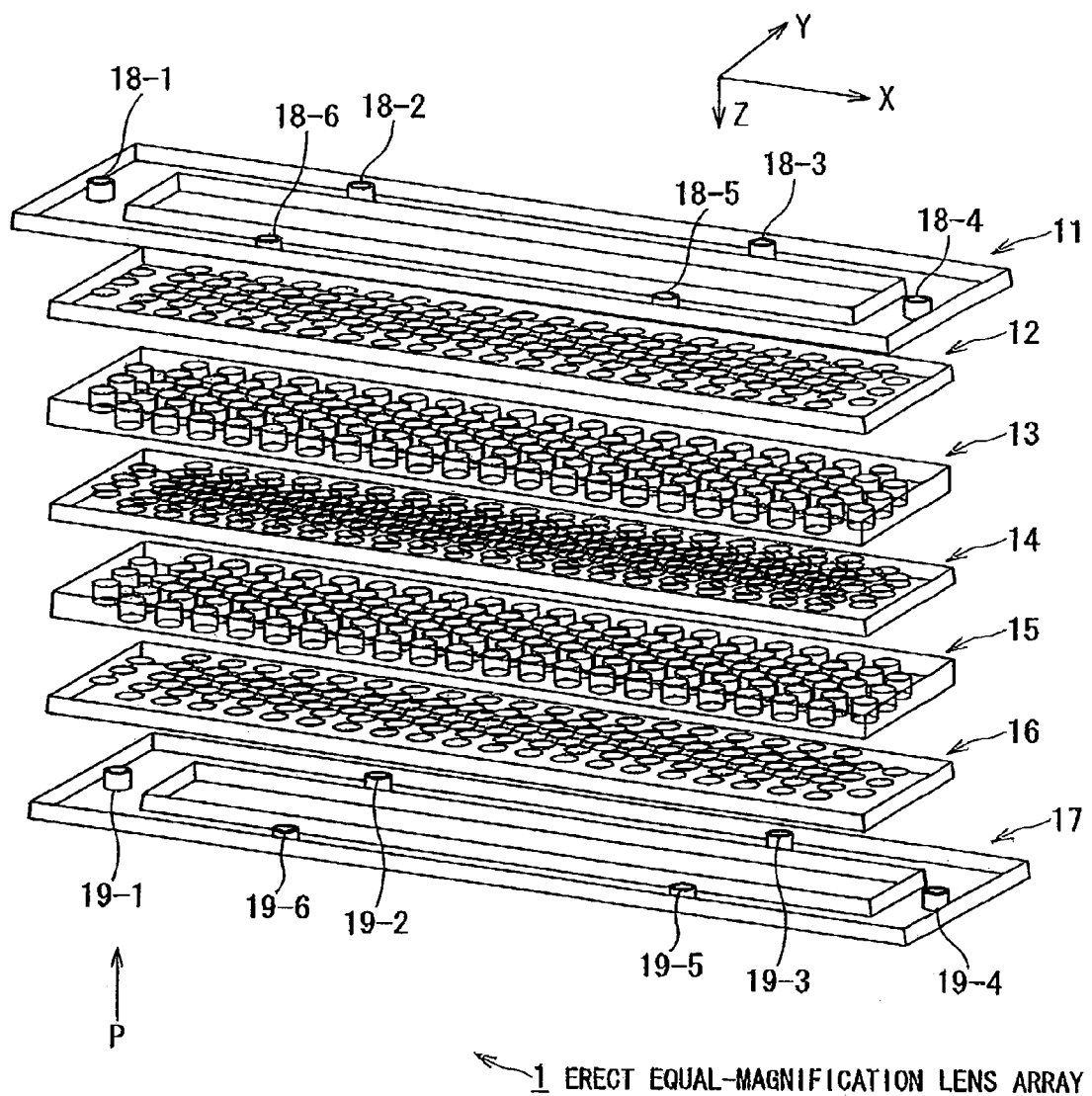
FIG. 1 is a disassembled perspective view of an overall configuration of a lens array according to an embodiment of the present invention.
Figures 2A, 2B:
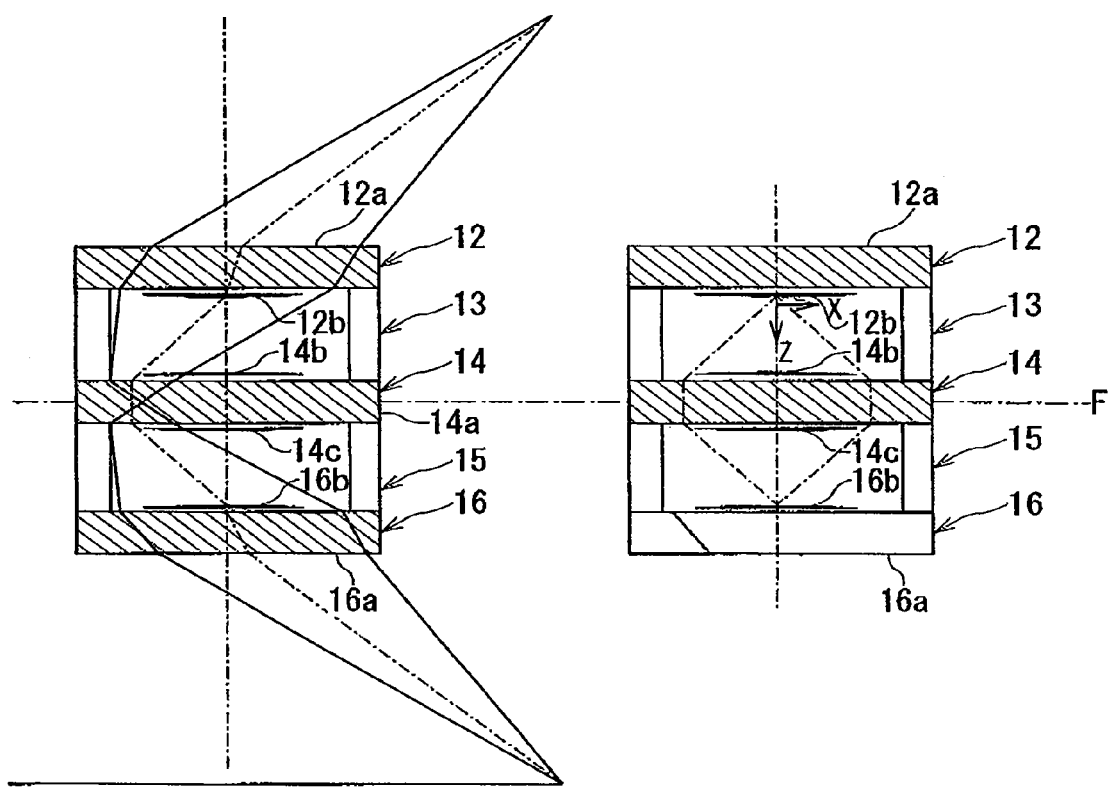
FIG. 2A is a diagram of a state in which a part of an erect equal-magnification lens array formed by superimposing plural components one on top of another is extracted.
FIG. 2B is a diagram of an optical path of a beam in the part of the erect equal-magnification lens array formed by superimposing plural components one on top of another.

An embodiment of the present invention is explained below with reference to the accompanying drawings. FIG. 1 is a diagram of an overall configuration of an erect equal-magnification lens array 1 according to the embodiment. As shown in FIG. 1, the erect equal-magnification lens array 1 includes a first pressing plate 11, a first lens array plate 12, a first aperture plate 13, a second lens array plate 14, a second aperture plate 15, a third lens array plate 16, and a second pressing plate 17. The first pressing plate 11, the first lens array plate 12, the first aperture plate 13, the second lens array plate 14, the second aperture plate 15, the third lens array plate 16, and the second pressing plate 17 included in the erect equal-magnification lens array 1 are superimposed one on top of another in order. FIG. 2A is a diagram of a state in which a part of the erect equal-magnification lens array 1 formed by superimposing plural components one on top of another is extracted.

To secure flatness of the lens array 1, the first pressing plate 11 and the second pressing plate 17 hold the components other than the first pressing plate 11 and the second pressing plate 17 included in the erect equal-magnification lens array 1 therebetween to thereby press the components. The first pressing plate 11 includes positioning pin holes 18-1 to 18-6 for inserting threaded positioning pins. Similarly, the second pressing plate 17 includes positioning pin holes 19-1 to 19-6 for inserting threaded positioning pins.

The first lens array plate 12 includes a lens plate 12a having a planar shape and a group of plural convex lenses arrayed on one side of the lens plate 12a. The convex lenses arrayed on the lens plate 12a respectively include projections 12b having a convex shape. The first lens array plate 12 has a planar shape on an incident surface side on which a beam is made incident and has a convex shape on an emission surface side from which the ray is emitted. The first aperture plate 13 includes plural apertures that are concentric with circles formed by crossing lines of the projections 12b of the convex lenses of the first lens array plate 12 and the lens plate 12a and have an aperture radius substantially the same as that of the circles.

The second lens array plate 14 includes a lens plate 14a having a planar shape and a group of plural convex lenses arrayed on both sides of the lens plate 14a. The convex lenses arrayed on one side of the lens plate 14a respectively include projections 14b having a convex shape. The convex lenses arrayed on the other side of the lens plate 14a respectively include projections 14c having a convex shape. The second lens array plate 14 includes, in positions opposed to the projections 12b of the lenses of the first lens array plate 12, the projections 14b of the convex lenses arrayed on one side of the lens plate 14a. Circles formed by crossing lines of the projections 14b of the convex lenses arrayed on one side of the second lens array plate 14 and the lens plate 14a are concentric with the circles formed by the crossing lines of the projections 12b of the convex lenses of the first lens array plate 12 and the lens plate 12a and have a radius, an absolute value of which is substantially the same as that of the circles. Similarly, circles formed by crossing lines of the projections 14c of the convex lenses arrayed on the other side of the second lens array plate 14 and the lens plate 14a are also concentric with the circles formed by the crossing lines of the projections 12b of the convex lenses of the first lens array plate 12 and the lens plate 12a and have a radius, an absolute value of which is substantially the same as that of the circles.

The second aperture plate 15 has a shape same as that of the first aperture plate 13. Specifically, the second aperture plate 15 includes plural apertures that are concentric with the circles formed by the crossing lines of the projections 12b of the convex lenses of the first lens array plate 12 and the lens plate 12a (the circles formed by the crossing lines of the projections 14c of the convex lenses of the second lens array plate 14 and the lens plate 14a) and have an aperture radius substantially the same as that of the circles. The third lens array plate 16 includes a lens plate 16a having a planar shape and a group of plural convex lenses arrayed on one side of the lens plate 16a. The convex lenses arrayed on the lens plate 16a respectively include projections 16b having a convex shape. The third lens array plate 16 has a convex shape on an incident surface side on which a beam is made incident and has a planar shape on an emission surface side from which the beam is emitted. The shapes on the incident surface side and the emission surface side of the third lens array plate 16 are opposite to the shapes of the incident surface side and the emission surface side of the first lens array plate 12.

FIG. 3A is a plan view of the erect equal-magnification lens array 1 shown in FIG. 1 viewed from a direction of an arrow P in which plural components are positioned after being superimposed one on top of another. FIG. 3B is a side view of the erect equal-magnification lens array 1 shown in FIG. 1 in which the plural components are positioned after being superimposed one on top of another. FIG. 3C is a diagram of a surface of the second aperture plate 15 set in contact with the third lens array plate 16. FIG. 3D is a diagram of a surface of the second aperture plate 15 set in contact with the second lens array plate 14. FIG. 3E is a diagram of a surface of the second lens array plate 14 set in contact with the second aperture plate 15. FIG. 3F is a diagram of a surface of the second lens array plate 14 set in contact with the first aperture plate 13. FIG. 3G is a diagram of a surface of the first aperture plate 13 set in contact with the second lens array plate 14. FIG. 3H is a diagram of a surface of the first aperture plate 13 set in contact with the first lens array plate 12. FIG. 3I is a diagram of a surface of the first lens array plate 12 set in contact with the first aperture plate 13.

As shown in FIGS. 3A and 3B, six threaded positioning pins 20 are inserted from positioning pin holes 19-1 to 19-6 of the second pressing plate 17. The threaded positioning pins 20 increase accuracy of relative position among lens array plates and aperture plates which comprise the erect equal-magnification lens array 1.

As shown in FIG. 3A, the third lens array plate 16 includes forty-six fit-in projections 21 around the group of plural lenses arrayed on the lens plate 16a. The third lens array plate 16 includes the plural fit-in projections 21 on the surface of the lens plate 16a on which the projections 16b of the third lens array plate 16 are arrayed. On the other hand, as shown in FIG. 3C, the second aperture plate 15 includes plural fit-in holes 22, which fit in the plural fit-in projections 21 of the third lens array plate 16, on the surface of the second aperture plate 15 set in contact with the third lens array plate 16. Plural fit-in holes may be plural fit-in recesses. The number of fit-in holes 22 is the same as the number of fit-in projections 21 of the third lens array plate 16. As shown in FIG. 3D, the second aperture plate 15 includes plural fit-in holes 23, which fit in plural fit-in projections 24 of the second lens array plate 14, on the surface of the second aperture plate 15 set in contact with the second lens array plate 14. The lens array plate have the fit-in projections which are similar to lens, and the aperture plate have the fit-in holes which are similar to the apertures provided on the aperture plate it is possible to apply each preferable process of manufacture to the fit-in projection or the fit-in hole.

As shown in FIG. 3E, the second lens array plate includes the plural fit-in projections 24 on the surface of the lens plate 14a on which the projections 14c of the convex lenses of the second lens array plate 14 are arrayed. As shown in FIG. 3F, the second lens array plate 14 includes plural fit-in projections 25 on the surface of the lens plate 14a on which the projections 14b of the second lens array plate 14 are arrayed.

As shown in FIG. 3G, the first aperture plate 13 includes plural fit-in holes 26, which fit in the plural fit-in projections 25 of the second lens array plate 14, on the surface of the first aperture plate 13 set in contact with the second lens array plate 14. As shown in FIG. 3H, the first aperture plate 13 includes plural fit-in holes 27, which fit in plural fit-in projections 28 of the first lens array plate 12, on the surface of the first aperture plate 13 set in contact with the first lens array plate 12.

In this way, the first lens array plate 12, the first aperture plate 13, the second lens array plate 14, the second aperture plate 15, and the third lens array plate 16 are fit in one another by the fit-in projections and the fit-in holes among the components having a contact relation with one another. Therefore, in the erect equal-magnification lens array 1 according to this embodiment, the positions of the first lens array plate 12, the first aperture plate 13, the second lens array plate 14, the second aperture plate 15, and the third lens array plate 16 are determined by fit-in of holes and projections among the components adjacent to one another other than the threaded positioning pins 20. In FIG. 3A to 3I, black color shows fit-in holes and gray color shows fit-in projections.

FIG. 2B is a diagram of an optical path of a beam in a part of the erect equal-magnification lens array 1 formed by superimposing plural components one on top of another. As shown in FIG. 2B, an end face on an incidence side and an end face on an emission side of the erect equal-magnification lens array 1 are planes. Since the end face on the incidence side and the end face on the emission side of the erect equal-magnification lens array 1 are planes, occurrence of stray light can be prevented in the first lens array plate 12 and the third lens array plate 16. Specifically, since the end face on the incidence side and the end face on the emission side of the erect equal-magnification lens array 1 are planes, in the first lens array plate 12 and the third lens array plate 16, a beam can be prevented from reaching, after being refracted by a surface optically having power among the lens surfaces, a surface optically having power among lens surfaces adjacent to the lens surfaces. Occurrence of stray light can be prevented in the first lens array plate 12 and the third lens array plate 16.

More specifically, the first lens array plate 12 has a planar shape on an incident surface side and has a convex shape on an emission surface side. Therefore, a beam made incident from an incident surface of one lens of the first lens array plate 12 reaches a surface optically having power for the first time on the emission surface side. The beam made incident from the incident surface of one lens of the first lens array plate 12 is not refracted by the surface optically having power in the first lens array plate 12. Therefore, the beam made incident from the incident surface of one lens of the first lens array plate 12 does not reach surfaces optically having power among lens surfaces adjacent to a lens on which the beam is made incident.

On the other hand, the third lens array plate 16 has a convex shape on an incident surface side and has a planar shape on an emission surface side. Therefore, a beam made incident from an incident surface of one lens of the first lens array plate 12 reaches an emission surface after being refracted by a surface optically having power on the incident surface side. The third lens array plate 16 has the planar shape on the emission surface side and does not have a surface optically having power. Therefore, the beam made incident from the incident surface of one lens of the third lens array plate 16 does not reach a surface optically having power among lens surfaces adjacent to a lens on which the beam is made incident.

In this way, occurrence of stray light can be prevented in the first lens array plate 12 and the third lens array plate 16. In order to prevent occurrence of stray light in the erect equal-magnification lens array 1, occurrence of stray light only has to be prevented between the emission surface of the first lens array plate 12 and the incident surface of the third lens array plate 16. Therefore, the erect equal-magnification lens array 1 according to this embodiment only has to be adapted to prevent occurrence of stray light between the first lens array plate 12 and the second lens array plate 14 and prevent occurrence of stray light between the second lens array plate 14 and the third lens array plate 16. The erect equal-magnification lens array 1 according to this embodiment includes the first aperture plate 13, which is a stop having cylindrical holes, between the first lens array plate 12 and the second lens array plate 14. The first aperture plate 13 can prevent a beam emitted from the emission surface of one lens of the first lens array plate 12 from being made incident on lenses adjacent to the lens and can prevent occurrence of stray light between the first lens array plate 12 and the second lens array plate 14. Therefore, stray light passing through different optical paths is not made incident on the lens surfaces of the second lens array plate 14.

The erect equal-magnification lens array 1 according to this embodiment includes the second aperture plate 15, which is a stop having cylindrical holes, between the second lens array plate 14 and the third lens array plate 16. Even if a beam emitted from the emission surface of the second lens array plate 14 is about to be made incident on the lenses of the third lens array plate 16 present on different optical paths, the second aperture plate 15 can eliminate stray light made incident on the different optical paths.

In the erect equal-magnification lens array 1 according to this embodiment, a distal end of the first lens array plate 12 and a distal end of the third lens array plate 16 are set in a conjugate relation with respect to the second lens array plate 14. Therefore, even if an object point moves to an end of an effective area of the lens array, a beam can be prevented from being eclipsed by the aperture plates (the first aperture plate 13 and the second aperture plate 15). A fall in an amount of light due to the movement of the object point to the end of the effective area of the lens array can be prevented. A change in an amount of light can be prevented. In the erect equal-magnification lens array 1 according to this embodiment, since a loss of an amount of light is small, a light amount as a whole can be maximized. The distal end of the first lens array plate 12 is a distal end of the emission surface of the first lens array plate 12 because the incident surface side of the first lens array plate 12 is formed in the planar shape. The distal end of the first lens array plate 12 is a rear side principal point. On the other hand, the distal end of the third lens array plate 16 is a distal end of the incident surface of the third lens array plate 16 because the emission surface side of the third lens array plate 16 is formed in the planar shape. The distal end of the third lens array plate 16 is a front side principal point.

Setting the distal end of the first lens array plate 12 and the distal end of the third lens array plate 16 in the conjugate relation with respect to the second lens array plate 14 means that the distal end of the first lens array plate 12 and the distal end of the third lens array plate 16 are symmetrical with respect to an alternate long and short dash line F shown in FIG. 2, and beam emitted from the distal end of the first lens array plate 12 passes the distal end of the third lens array plate 16.

In the case of FIG. 1 to FIGS. 3A to 3I, in order to secure flatness of the erect equal-magnification lens array 1, the first pressing plate 11 and the second pressing plate 17 hold the components other than the first pressing plate 11 and the second pressing plate 17 included in the erect equal-magnification lens array 1 therebetween to thereby press the components. However, the present invention is not limited to such a case. The first lens array plate 12, the first aperture plate 13, the second lens array plate 14, the second aperture plate 15, and the third lens array plate 16 may be joined by bonding without using the first pressing plate 11 and the second pressing plate 17.

Figure 4:
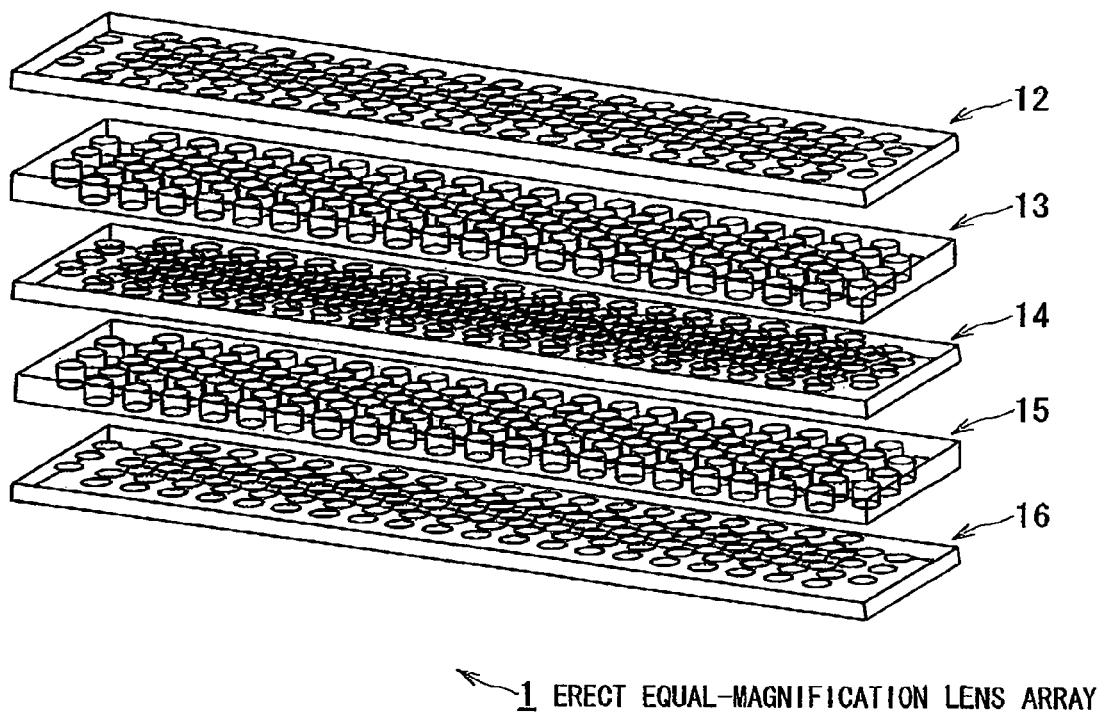
FIG. 4 is a diagram of an overall configuration of another erect equal-magnification lens array according to the embodiment.
Figure 5:
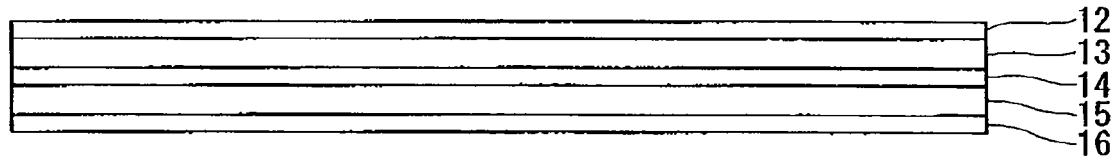
FIG. 5 is a side view of the erect equal-magnification lens array shown in FIG. 4 in which plural components are positioned after being superimposed one on top of another.

FIG. 4 is a diagram of an overall configuration of another erect equal-magnification lens array 1 according to this embodiment. As shown in FIG. 4, the erect equal-magnification lens array 1 includes the first lens array plate 12, the first aperture plate 13, the second lens array plate 14, the second aperture plate 15, and the third lens array plate 16. Components of the erect equal-magnification lens array 1 shown in FIG. 4 are basically the same as the components of the erect equal-magnification lens array 1 shown in FIG. 1 to FIGS. 3A to 3I. In particular, the first lens array plate 12, the first aperture plate 13, the second lens array plate 14, the second aperture plate 15, and the third lens array plate 16 have the fit-in holes and projections shown in FIG. 3A and FIGS. 3C to 3I. The first lens array plate 12, the first aperture plate 13, the second lens array plate 14, the second aperture plate 15, and the third lens array plate 16 are fit in by the fit-in holes and projections among the components adjacent to one another. The components of the erect equal-magnification lens array 1 are bonded by an adhesive among the components adjacent to one another. FIG. 5 is a side view of the erect equal-magnification lens array 1 shown in FIG. 4 in which plural components are positioned after being superimposed one on top of another.

In the case of FIGS. 4 and 5, the first lens array plate 12, the first aperture plate 13, the second lens array plate 14, the second aperture plate 15, and the third lens array plate 16 are joined by bonding without using the first pressing plate 11 and the second pressing plate 17. However, the present invention is not limited to such a case. Instead of the bonding by the adhesive, for example, it is also possible to provide positioning holes in the first lens array plate 12, the first aperture plate 13, the second lens array plate 14, the second aperture plate 15, and the third lens array plate 16 and position the components with threaded positioning pins.

Figure 6:
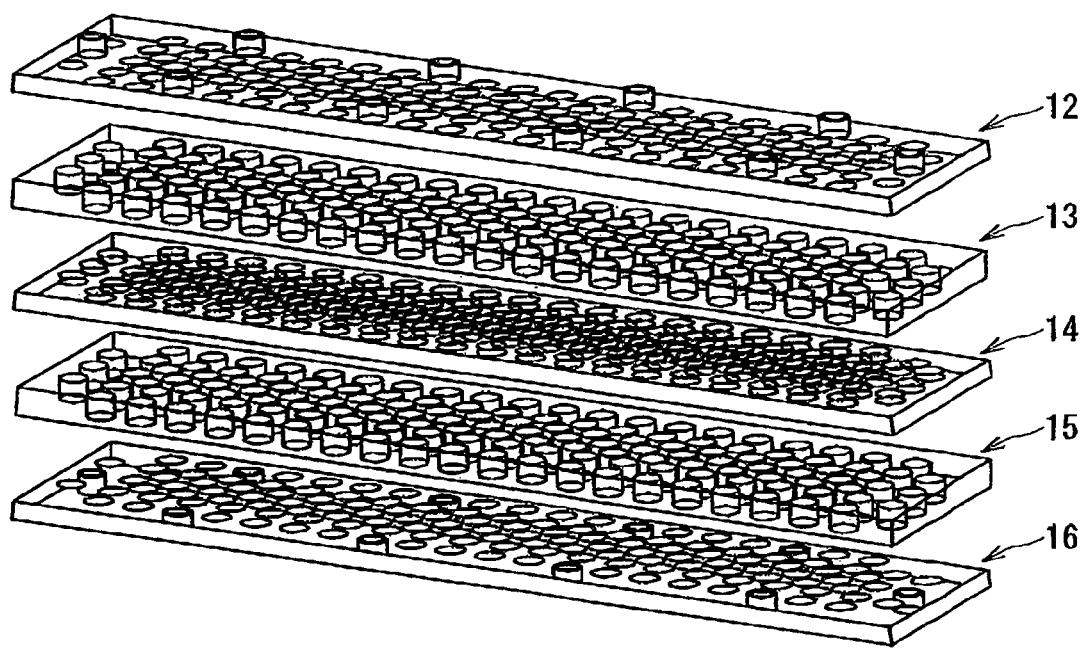
FIG. 6 is a diagram of an overall configuration of still another erect equal-magnification lens array according to the embodiment.

FIG. 6 is a diagram of an overall configuration of still another erect equal-magnification lens array 1 according to this embodiment. As shown in FIG. 6, the erect equal-magnification lens array 1 includes the first lens array plate 12, the first aperture plate 13, the second lens array plate 19, the second aperture plate 15, and the third lens array plate 16. Components of the erect equal-magnification lens array 1 shown in FIG. 6 are basically the same as the components of the erect equal-magnification lens array 1 shown in FIG. 1 to FIGS. 3A to 3I. In particular, the first lens array plate 12, the first aperture plate 13, the second lens array plate 14, the second aperture plate 15, and the third lens array plate 16 have the fit-in holes and projections shown in FIG. 3A and FIGS. 3C to 3I. The first lens array plate 12, the first aperture plate 13, the second lens array plate 14, the second aperture plate 15, and the third lens array plate 16 are fit in by the fit-in holes and projections among the components adjacent to one another. In the case of FIG. 6, the components of the erect equal-magnification lens array 1 are not bonded by an adhesive among the components adjacent to one another.

Figure 7A:
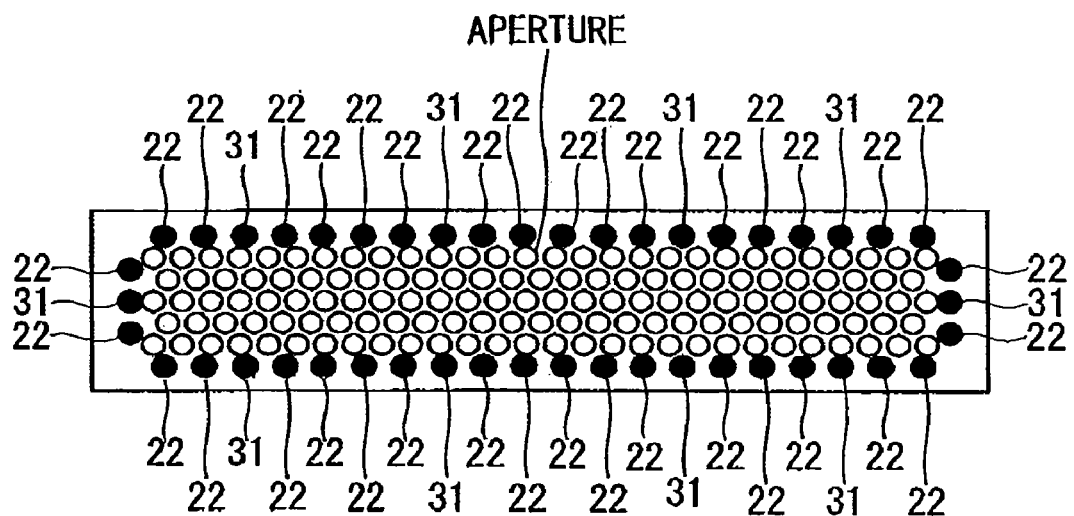
FIG. 7A is a diagram of a surface of the second aperture plate set in contact with the third lens array plate.
Figure 7B:
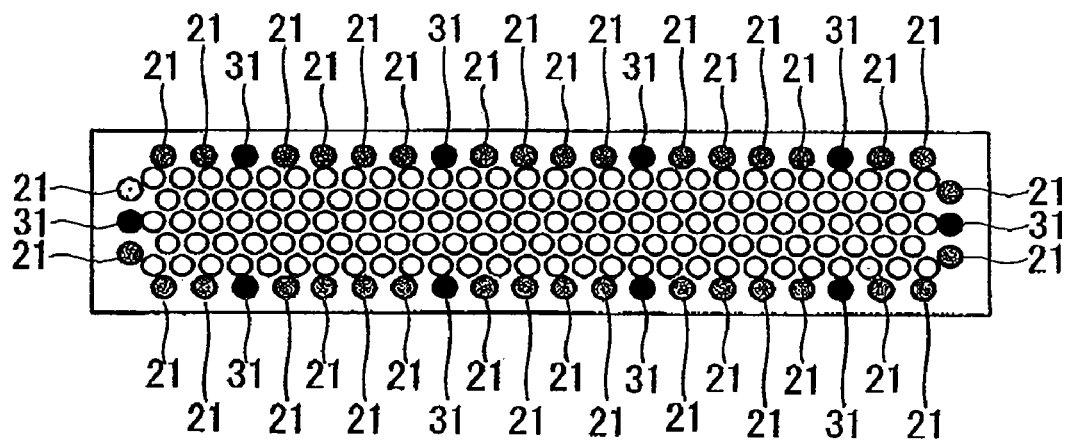
FIG. 7B is a diagram of a surface of the third lens array plate set in contact with the second aperture plate.

FIG. 7A is a diagram of a surface of the second aperture plate 15 set in contact with the third lens array plate 16. FIG. 7B is a diagram of a surface of the third lens array plate 16 set in contact with the second aperture plate 15. As shown in FIG. 7A, the second aperture plate 15 includes, on the surface of the second aperture plate 15 set in contact with the third lens array plate 16, the plural fit-in holes 22 that fit in the plural fit-in projections 21 of the third lens array plate 16. The second aperture plate 15 includes, on the surface of the second aperture plate 15 set in contact with the third lens array plate 16, ten positioning pin holes 31 around the apertures besides the plural fit-in holes 22.

As shown in FIG. 72, the third lens array plate 16 includes, on the surface of the third lens array plate 16 set in contact with the second aperture plate 15, the plural fit-in projections 21 that fit with the plural fit-in holes 22 of the second aperture plate 15. The third lens array plate 16 includes ten positioning pin holes 31 around the group of projections 16b of the group of lenses besides the plural fit-in projections 21.

In the case of FIG. 6, the components other than the second aperture plate 15 and the third lens array plate 16 also include the positioning pin holes 31 besides the fit-in holes or the fit-in projections.

Figure 8:
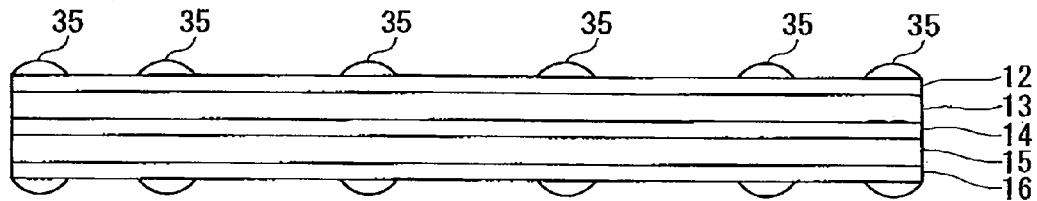
FIG. 8 is a side view of the erect equal-magnification lens array shown in FIG. 6 in which plural components are positioned after being superimposed one on top of another.

FIG. 8 is a side view of the erect equal-magnification lens array 1 shown in FIG. 6 in which the plural components are positioned after being superimposed one on top of another. As shown in FIG. 8, plural rivets 35 which double positioning pins are inserted in the positioning pin holes 31 of the components. The rivets 35 which double positioning pins position the erect equal-magnification lens array 1. This makes it possible to prevent the entire erect equal-magnification lens array 1 from bending because of the bonding of the components by the adhesive and equalize distortion of the entire erect equal-magnification lens array 1.

A convex shape of the projections of the lens surfaces used in FIGS. 1 to 8 may be a spherical shape or may be an aspherical shape. The aspherical shape as the convex shape of the projections of the lens surface is represented by Formula 1.

$$z = \frac{cvr^2}{1 + \sqrt{1 - cv^2(cc+1)r^2}} + adr^4 + aer^6 + afr^8 + agr^{10} \quad \text{Formula 1}$$

where $$r = \sqrt{x^2 + y^2}$$

In Formula 1, x, y, and z indicate local coordinate systems of the lens surfaces. Directions of an x axis, a y axis, and a z axis are shown in FIG. 1. cv of Formula 1 is an inverse of a radius. The position of the center of the erect equal-magnification lens array 1 is indicated as follows:

The channel centers are located at (X,Y) coordinates
X=i*(X spacing), where i=0, ±1, ±2, . . .
Y=j*(Y spacing)+offset, where j=0, ±1, ±2, . . . and offset=Y offset if i is odd, or 0 if i is even.

A first term in Formula 1 is a spherical term and second to fifth terms are aspherical terms. When the convex shape of the projections of the lens surfaces is the spherical shape, z is represented by only the spherical term of Formula 1 and cc in this case is 0.

Table 1 is a data table of data obtained when the convex shape of the projections of all the lens surfaces of the erect equal-magnification lens array 1 is the aspherical shape.

TABLE 1

*LENS DATA
array lens aeae

| SRF | RADIUS | THICKNESS | APERTURE RADIUS | GLASS |
|---|---|---|---|---|
| OBJ | 0.0 | 1.0 | — | AIR |
| 1 | 0.0 | 5.6 | — | AIR |
| 2 | 0.0 | 0.0 | — | AIR |
| 3 | 0.0 | 0.0 | — | AIR |
| 4 | 0.0 | 0.5 | — | ARTON |
| 5 | −0.5097186922693 | 0.9478309506394 | 0.165 | AIR |
| 6 | 0.4912313197898 | 0.5 | 0.165 | ARTON |
| 7 | −0.4912313197898 | 0.9478309506394 | 0.165 | AIR |
| 8 | 0.5097186922693 | 0.5 | 0.165 | ARTON |
| 10 | 0.0 | 5.6 | — | AIR |
| IMS | 0.0 | 1.0 | — | |

*CONIC AND POLYNOMIAL ASPHERIC DATA

| SRF | CC | AD | AE | AF | AG |
|---|---|---|---|---|---|
| 5 | −0.0826095761567 | 1.7275848028609 | −0.1507316060879 | 0.0 | 0.0 |
| 6 | −9.6905906715751 | 8.3089822610704 | −154.135555008704 | 0.0 | 0.0 |
| 7 | −9.6905906715751 | −8.3089822610704 | 154.135555008704 | 0.0 | 0.0 |
| 8 | −0.0826095761567 | −1.7275848028609 | 0.1507316060879 | 0.0 | 0.0 |

*LENS ARRAY DATA
SRF 3:

| TYPE Regular | END SURF 9 | DRAW ALL CHANNELS: Yes |
|---|---|---|
| X SPACING 0.2 | Y SPACING 0.69282 | Y OFFSET 0.34641 |

Figure 9:
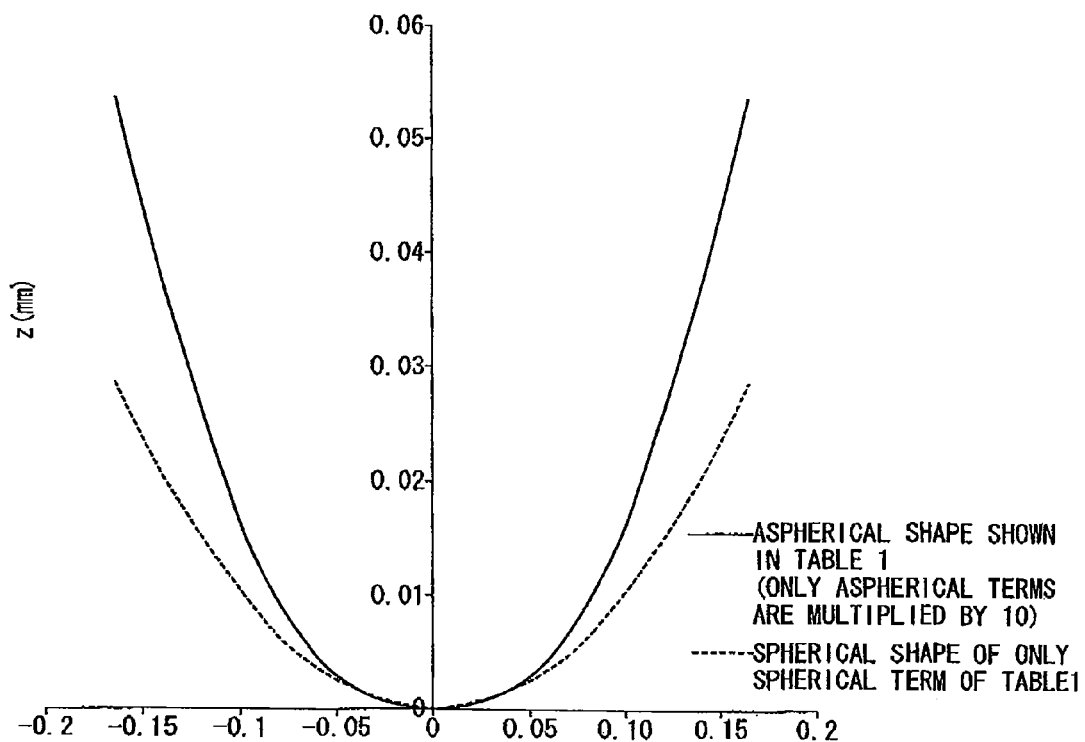
FIG. 9 is a graph of comparison of a spherical shape and an aspherical shape as a convex shape of projections of lens surfaces used in FIGS. 1 to 8.

FIG. 9 is a graph of comparison of the spherical shape and the aspherical shape as the convex shape of projections of the lens surfaces used in FIGS. 1 to 8. A solid line shown in FIG. 9 represents the aspherical shape indicated by only the aspherical terms. A dotted line shown in FIG. 9 indicates the spherical shape indicated by only the spherical term. Table 2 is a table of a simulation result of a shape of the emission surface of the second lens array plate 14 shown in FIG. 9. The aspherical shape in Table 2 is a shape obtained by multiplying only the aspherical terms in Table 1 by ten. The spherical shape in Table 2 is a shape of only the spherical term in Table 1.

TABLE 2

| 1.443797 | | |
|---|---|---|
| | Aspherical shape (only the aspherical terms are multiplied by ten) | Shape of only the spherical term |
| −0.165 | 0.053505 | 0.02854 |
| −0.1485 | 0.043066 | 0.022984 |
| −0.132 | 0.032658 | 0.018067 |
| −0.1155 | 0.023378 | 0.013771 |
| −0.099 | 0.015754 | 0.010079 |
| −0.0825 | 0.009912 | 0.006977 |
| −0.066 | 0.005722 | 0.004454 |
| −0.0495 | 0.002917 | 0.0025 |
| −0.033 | 0.001194 | 0.00111 |
| −0.0165 | 0.000283 | 0.000277 |
| 0 | 0 | 0 |
| 0.0165 | 0.000283 | 0.000277 |
| 0.033 | 0.001194 | 0.00111 |
| 0.0495 | 0.002917 | 0.0025 |
| 0.066 | 0.005722 | 0.004454 |
| 0.0825 | 0.009912 | 0.006977 |

TABLE 2-continued

| 1.443797 | | |
|---|---|---|
| | Aspherical shape (only the aspherical terms are multiplied by ten) | Shape of only the spherical term |
| 0.099 | 0.015754 | 0.010079 |
| 0.1155 | 0.023378 | 0.013771 |
| 0.132 | 0.032658 | 0.018067 |
| 0.1485 | 0.043066 | 0.022984 |
| 0.165 | 0.053505 | 0.02854 |

Figure 10:
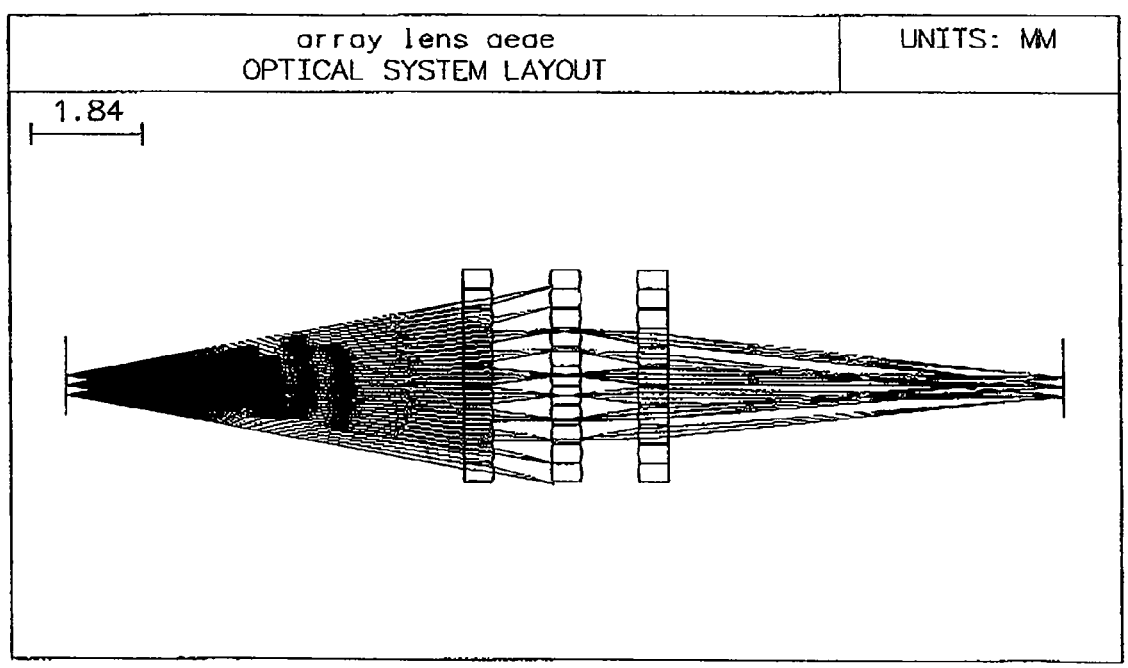
FIG. 10 is a diagram of a state in which abeam passes through the erect equal-magnification lens array when a convex shape of projections of all lens surfaces of the erect equal-magnification lens array is the aspherical shape.
Figure 11:
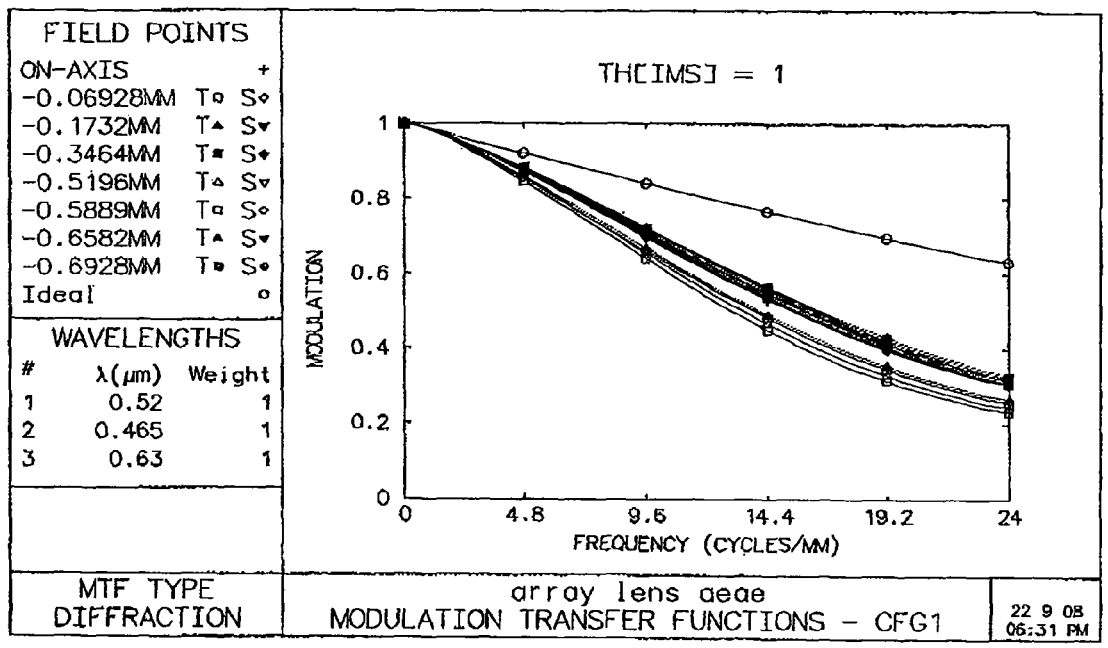
FIG. 11 is a graph in which a frequency (1/mm) is plotted on the abscissa and an MTF (Modulation Transfer Function) is plotted on the ordinate when the convex shape of the projections of all the lens surfaces of the erect equal-magnification lens array is the aspherical shape.

FIG. 10 is a diagram of a state in which a beam passes through the erect equal-magnification lens array 1 when the convex shape of the projections of all the lens surfaces of the erect equal-magnification lens array 1 is the aspherical shape. FIG. 11 is a graph in which a frequency (1/mm) is plotted on the abscissa and an MTF (Modulation Transfer Function) is plotted on the ordinate when the convex shape of the projections of all the lens surfaces of the erect equal-magnification lens array 1 is the aspherical shape. The MTF is a modulation transfer function and is a quantitative index of a quality of an image. Specifically, the MTF indicates an ability of a lens or an optical system including the lens for transferring the contrast of an object to an image. When modulation depth M is defined as $(E_{max}-E_{min})/(E_{max}+E_{min})$, the MTF is represented by M (image plane)/M (document plane).

Figure 12:
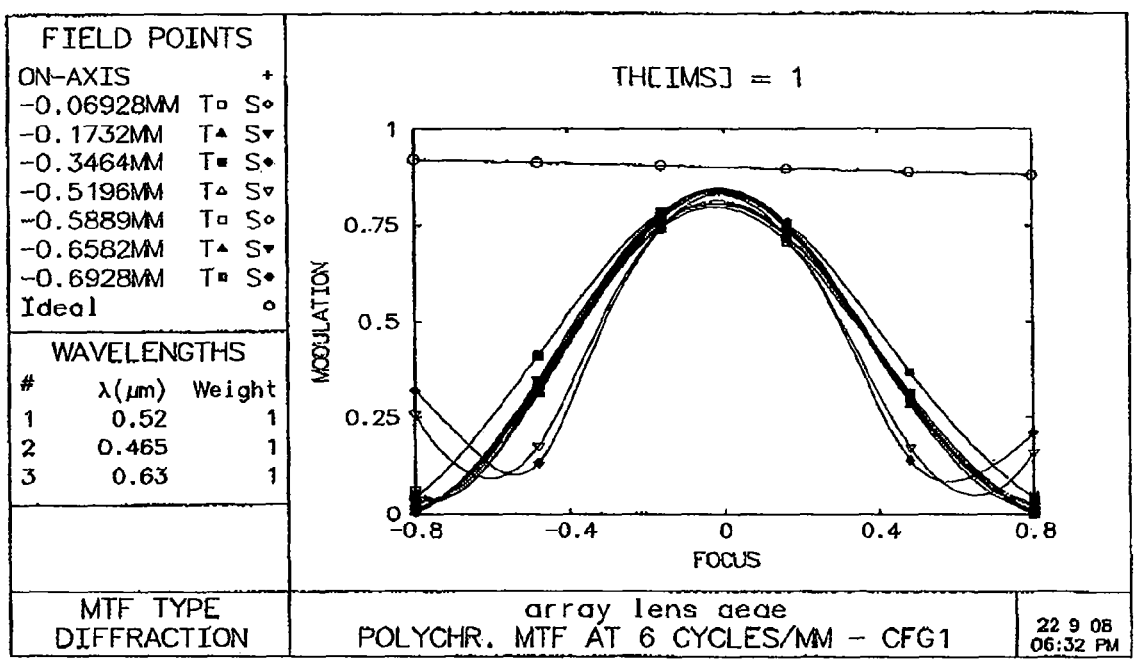
FIG. 12 is a graph in which an amount of defocus from a design image plane is plotted on the abscissa and an MTF is plotted on the ordinate if the convex shape of the projections of all the lens surfaces of the erect equal-magnification lens array is the aspherical shape.
Figure 13:
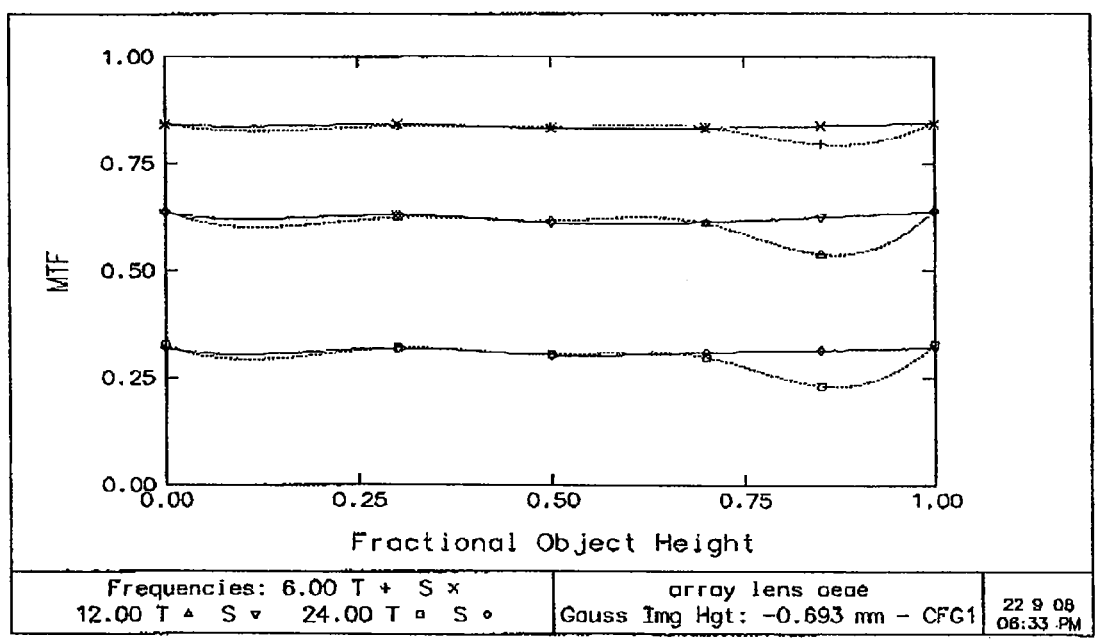
FIG. 13 is graph in which object point height normalized by 0.69282 of Y spacing is plotted on the abscissa and an MTF is plotted on the ordinate if the convex shape of the projections of all the lens surfaces of the erect equal-magnification lens array is the aspherical shape.

FIG. 12 is a diagram in which an amount of defocus from a design image plane is plotted on the abscissa and an MTF is plotted on the ordinate when the convex shape of the projections of all the lens surfaces of the erect equal-magnification lens array 1 is the aspherical shape. FIG. 13 is graph in which object point height normalized by 0.69282 of Y spacing is plotted on the abscissa and an MTF is plotted on the ordinate when the convex shape of the projections of all the lens surfaces of the erect equal-magnification lens array 1 is the aspherical shape.

On the other hand, Table 3 is a data table of data obtained when the convex shape of the projections of all the lens surfaces of the erect equal-magnification lens array 1 is the spherical shape.

TABLE 3

*LENS DATA
Spherical lens array

| SRF | RADIUS | THICKNESS | APERTURE RADIUS | GLASS |
|---|---|---|---|---|
| OBJ | 0.0 | 1.0 | — | AIR |
| 1 | 0.0 | 5.6 | — | AIR |
| 2 | 0.0 | 0.0 | — | AIR |
| 3 | 0.0 | 0.0 | — | AIR |
| 4 | 0.0 | 0.5 | 0.165 | ARTON |
| 5 | −0.5806234047175 | 1.155108030341 | 0.165 | AIR |
| 6 | 0.6926183501697 | 0.5 | 0.165 | ARTON |
| 7 | −0.6926183501697 | 1.155108030341 | 0.165 | AIR |
| 8 | 0.5806234047175 | 0.5 | 0.165 | ARTON |
| 10 | 0.0 | 5.6 | | AIR |
| IMS | 0.0 | 1.0 | | |

Figure 14:
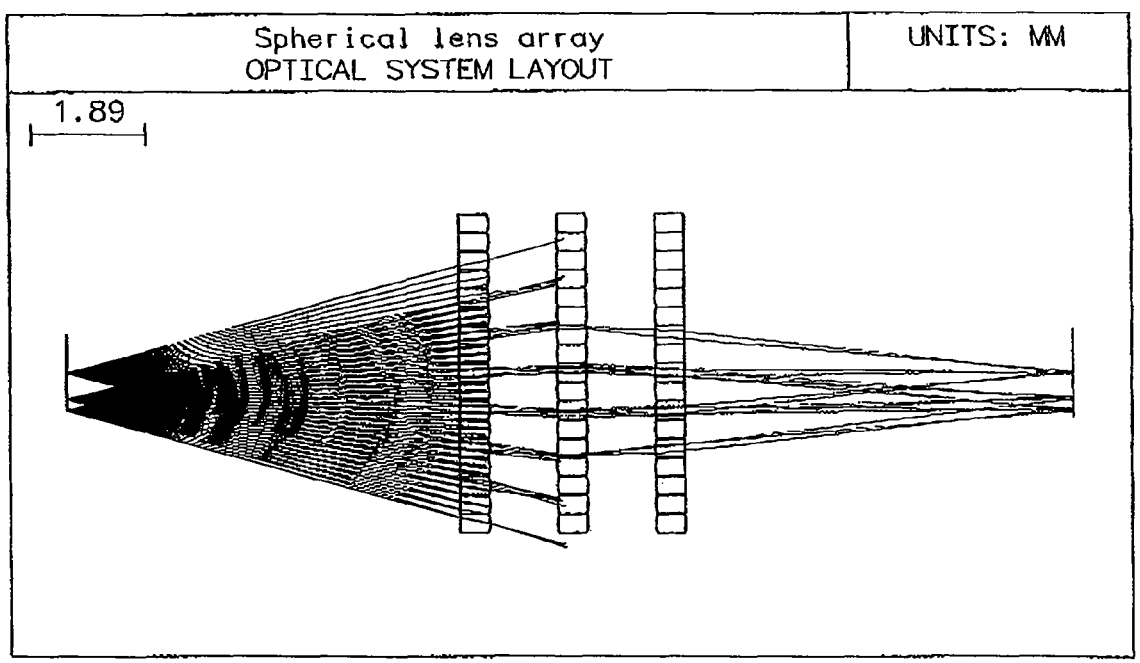
FIG. 14 is a diagram of a state in which a beam passes through the erect equal-magnification lens array if the convex shape of the projections of all the lens surfaces of the erect equal-magnification lens array is the spherical shape.
Figure 15:
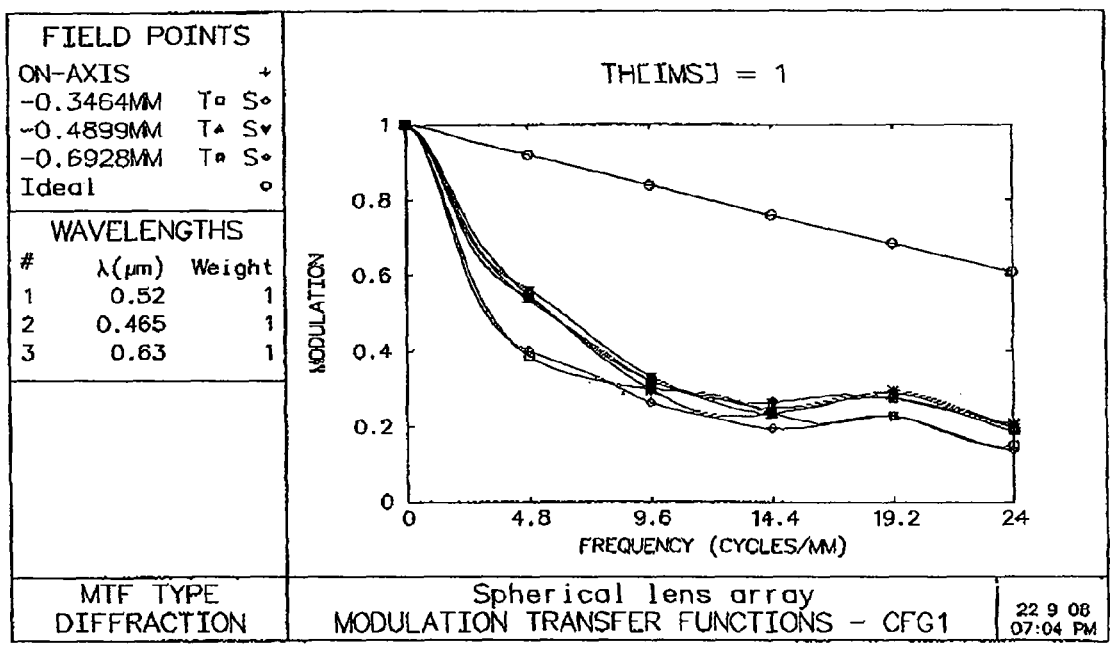
FIG. 15 is a graph in which a frequency (1/mm) is plotted on the abscissa and an MTF is plotted on the ordinate if the convex shape of the projections of all the lens surfaces of the erect equal-magnification lens array is the spherical shape.
Figure 16:
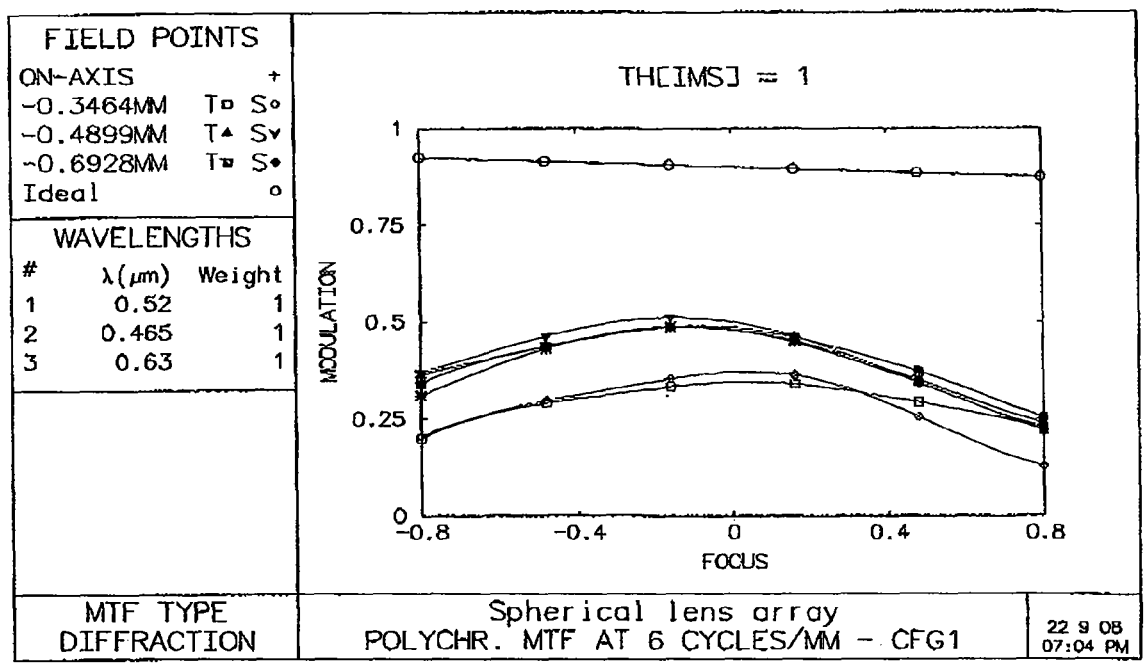
FIG. 16 is a graph in which an amount of defocus from a design image plane is plotted on the abscissa and an MTF is plotted on the ordinate if the convex shape of the projections of all the lens surfaces of the erect equal-magnification lens array is the spherical shape.
Figure 17:
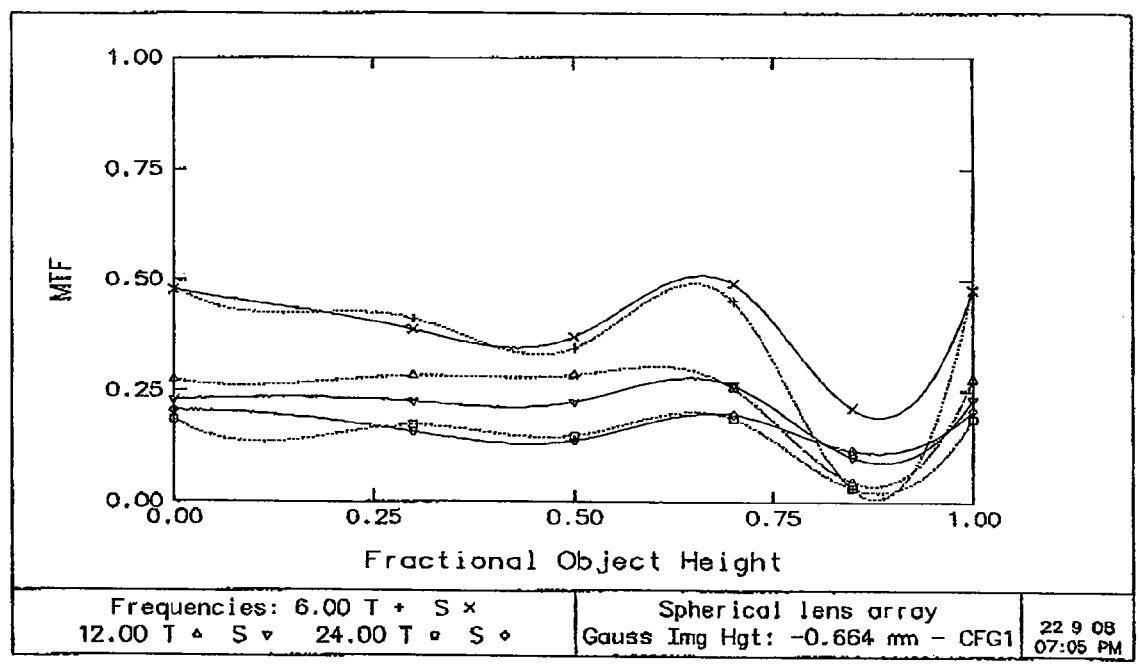
FIG. 17 is a graph in which object point height normalized by 0.69282 of Y spacing is plotted on the abscissa and an MTF is plotted on the ordinate if the convex shape of the projections of all the lens surfaces of the erect equal-magnification lens array is the spherical shape.

FIG. 14 is a diagram of a state in which a beam passes through the erect equal-magnification lens array 1 when the convex shape of the projections of all the lens surfaces of the erect equal-magnification lens array 1 is the spherical shape. FIG. 15 is a graph in which a frequency (1/mm) is plotted on the abscissa and an MTF is plotted on the ordinate when the convex shape of the projections of all the lens surfaces of the erect equal-magnification lens array 1 is the spherical shape. FIG. 16 is a graph in which an amount of defocus from a design image plane is plotted on the abscissa and an MTF is plotted on the ordinate when the convex shape of the projections of all the lens surfaces of the erect equal-magnification lens array 1 is the spherical shape. FIG. 17 is a graph in which object point height normalized by 0.69282 of Y spacing is plotted on the abscissa and an MTF is plotted on the ordinate when the convex shape of the projections of all the lens surfaces of the erect equal-magnification lens array 1 is the spherical shape.

Comparing FIGS. 10 to 13 and FIGS. 14 to 17, in particular, comparing FIG. 11 and FIG. 15, it is seen that the MTF is improved by changing the convex shape of the projections from the spherical shape to the aspherical shape.

Table 4 is a table of a simulation result of a shape of the emission surface of the first lens array plate 12 and a shape of the incident surface of the third lens array plate 16. The shape of the emission surface of the first lens array plate 12 is opposite in sign to the shape of the incident surface of the third lens array plate 16.

TABLE 4

| cv | cc | ad | ae | af | ag |
|---|---|---|---|---|---|
| −1.961866447 | −0.082609576 | 1.7275848 | −0.15073 | 0 | 0 |
| −1.961866447 | | | | | |
| −1.722286756 | | | | | |

| | Aspherical shape shown in Table 1 | Shape of only the spherical term of Table 1 | Spherical shape of Table 3 |
|---|---|---|---|
| −0.165 | −0.026103111 | −0.027444761 | −0.023938091 |
| −0.1485 | −0.021231605 | −0.022111376 | −0.019311292 |

TABLE 4-continued

| −0.132 | −0.016839389 | −0.017388371 | −0.015203615 |
|---|---|---|---|
| −0.1155 | −0.012936646 | −0.013258326 | −0.01160382 |
| −0.099 | −0.009532967 | −0.009706547 | −0.008502318 |
| −0.0825 | −0.006637097 | −0.006720784 | −0.005891043 |
| −0.066 | −0.004256735 | −0.004291007 | −0.003763337 |
| −0.0495 | −0.002398383 | −0.002409225 | −0.002113865 |
| −0.033 | −0.001067217 | −0.001069358 | −0.000938544 |
| −0.0165 | −0.000266995 | −0.000267129 | −0.000234494 |
| 0 | 0 | 0 | 0 |
| 0.0165 | −0.000266995 | −0.000267129 | −0.000234494 |
| 0.033 | −0.001067217 | −0.001069358 | −0.000938544 |
| 0.0495 | −0.002398383 | −0.002409225 | −0.002113865 |
| 0.066 | −0.004256735 | −0.004291007 | −0.003763337 |
| 0.0825 | −0.006637097 | −0.006720784 | −0.005891043 |
| 0.099 | −0.009532967 | −0.009706547 | −0.008502318 |
| 0.1155 | −0.012936646 | −0.013258326 | −0.01160382 |
| 0.132 | −0.016839389 | −0.017388371 | −0.015203615 |
| 0.1485 | −0.021231605 | −0.022111376 | −0.019311292 |
| 0.165 | −0.026103111 | −0.027444761 | −0.023938091 |

Figure 18:
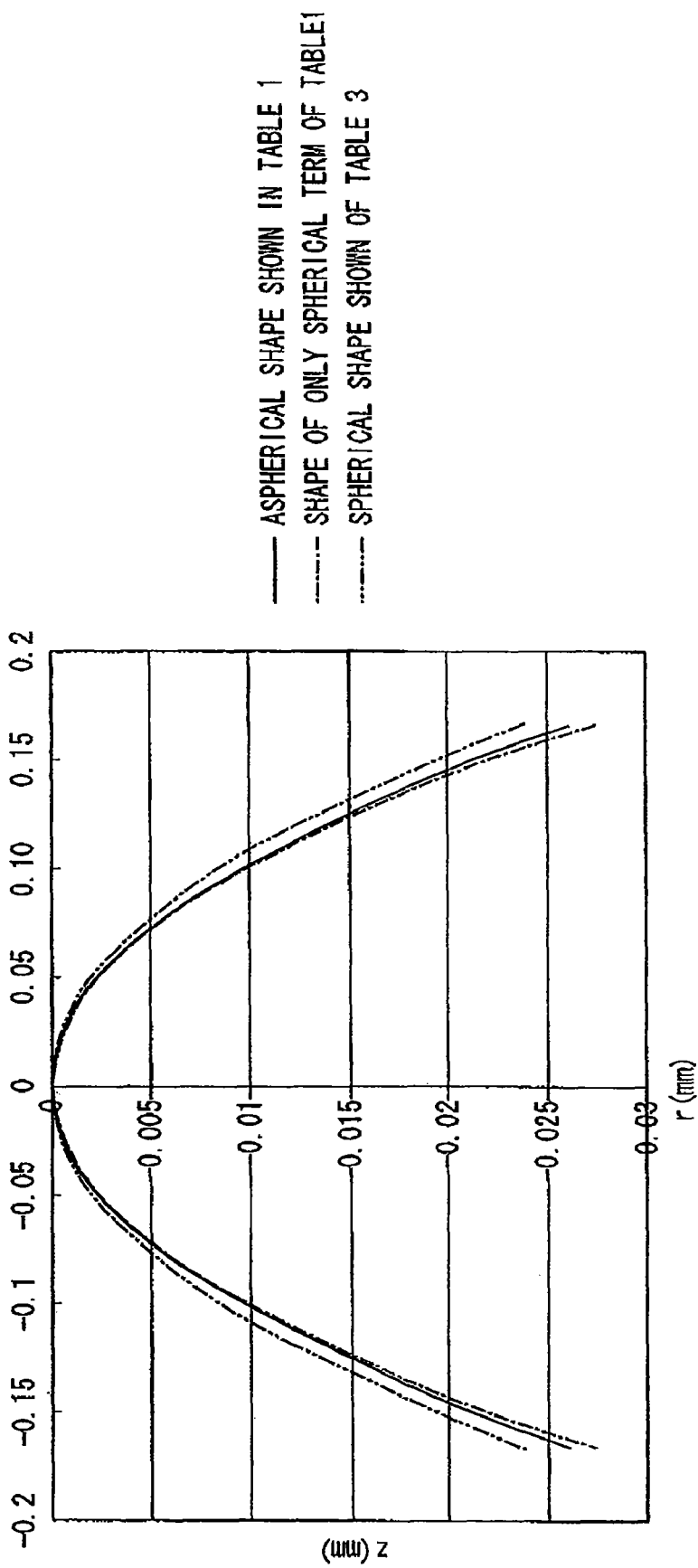
FIG. 18 is a graph of a shape of an emission surface of the first lens array plate and a shape of an incident surface of the third lens array plate represented by Table 4.

The shape of the emission surface of the first lens array plate 12 or the third lens array plate 16 represented by Table 4 is shown in FIG. 18.

Table 5 is a table of a simulation result of a shape of the incident surface of the second lens array plate 14.

TABLE 5

| cv | cc | ad | ae | af | ag |
|---|---|---|---|---|---|
| 2.035700819 | −9.690590672 | 8.308982261 | −154.136 | 0 | 0 |
| 2.035700819 | | | | | |
| 1.443796572 | | | | | |

| | Aspherical shape shown in Table 1 | Shape of only the spherical term of Table 1 | Spherical shape of Table 3 |
|---|---|---|---|
| −0.165 | 0.026070744 | 0.028540052 | 0.019940731 |
| −0.1485 | 0.021576522 | 0.022983565 | 0.016106762 |
| −0.132 | 0.017293369 | 0.018067279 | 0.012694693 |
| −0.1155 | 0.013363554 | 0.013771416 | 0.009698202 |
| −0.099 | 0.009876473 | 0.010079359 | 0.007111837 |
| −0.0825 | 0.006884738 | 0.006977296 | 0.004930973 |
| −0.066 | 0.00441722 | 0.004453948 | 0.00315176 |
| −0.0495 | 0.002488887 | 0.002500351 | 0.001771096 |
| −0.033 | 0.001107434 | 0.001109692 | 0.000786594 |
| −0.0165 | 0.000277047 | 0.000277188 | 0.000196565 |
| 0 | 0 | 0 | 0 |
| 0.0165 | 0.000277047 | 0.000277188 | 0.000196565 |
| 0.033 | 0.001107434 | 0.001109692 | 0.000786594 |
| 0.0495 | 0.002488887 | 0.002500351 | 0.001771096 |
| 0.066 | 0.00441722 | 0.004453948 | 0.00315176 |
| 0.0825 | 0.006884738 | 0.006977296 | 0.004930973 |
| 0.099 | 0.009876473 | 0.010079359 | 0.007111837 |
| 0.1155 | 0.013363554 | 0.013771416 | 0.009698202 |
| 0.132 | 0.017293369 | 0.018067279 | 0.012694693 |
| 0.1485 | 0.021576522 | 0.022983565 | 0.016106762 |
| 0.165 | 0.026070744 | 0.028540052 | 0.019940731 |

Figure 19:
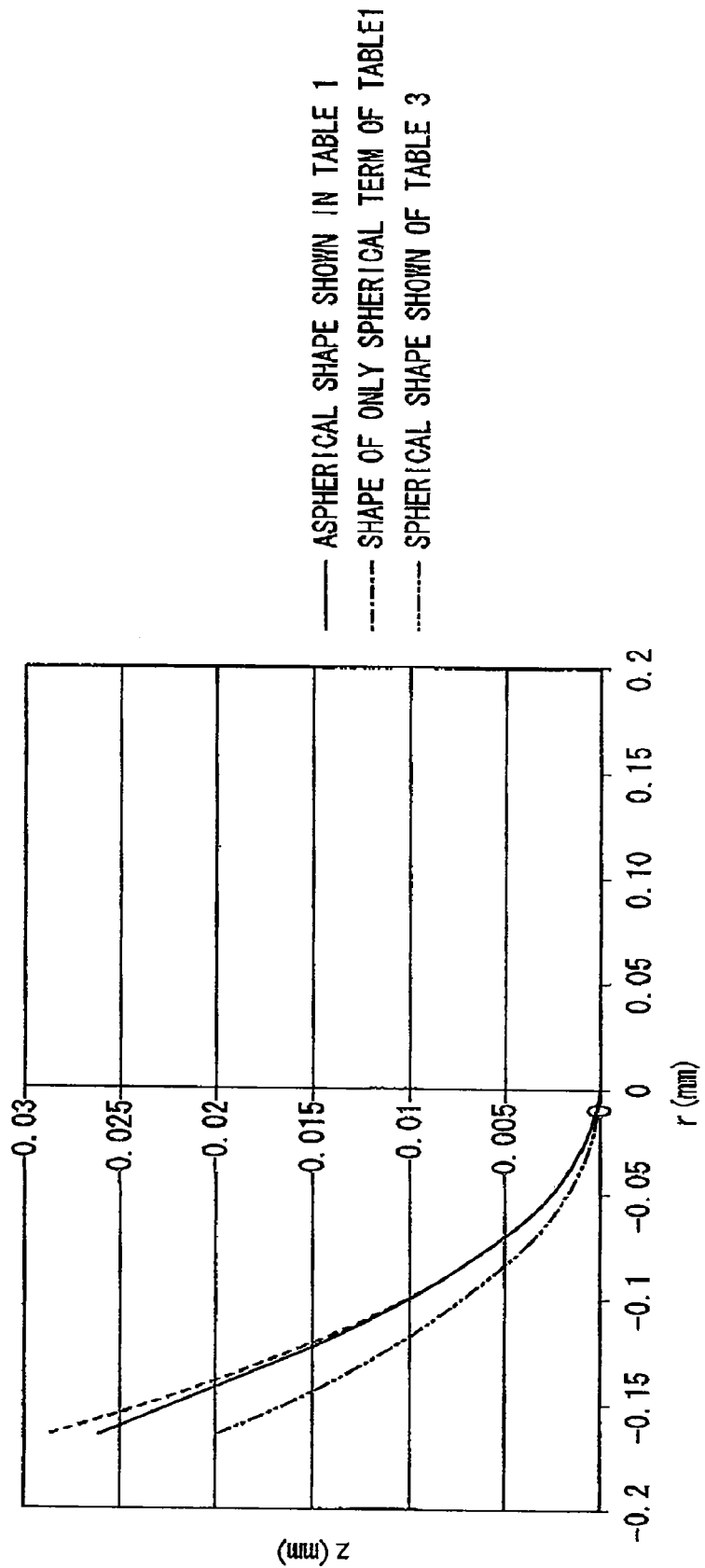
FIG. 19 is a graph of a shape of an emission surface and an incident surface of the second lens array plate represented by Table 5.

The shape of the incident surface of the second lens array plate 14 represented by Table 5 is shown in FIG. 19.

Figure 20:
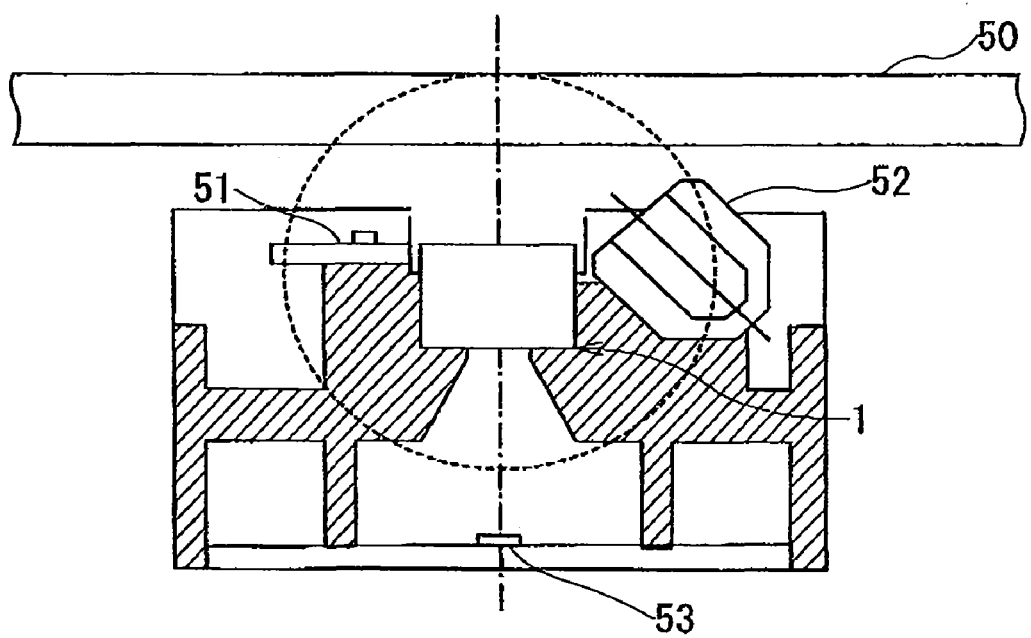
FIG. 20 is a sectional view of a CIS (Contact Image Sensor) in which the erect equal-magnification lens array according to the embodiment is mounted on a scanner scanning optical system.
Figure 21:
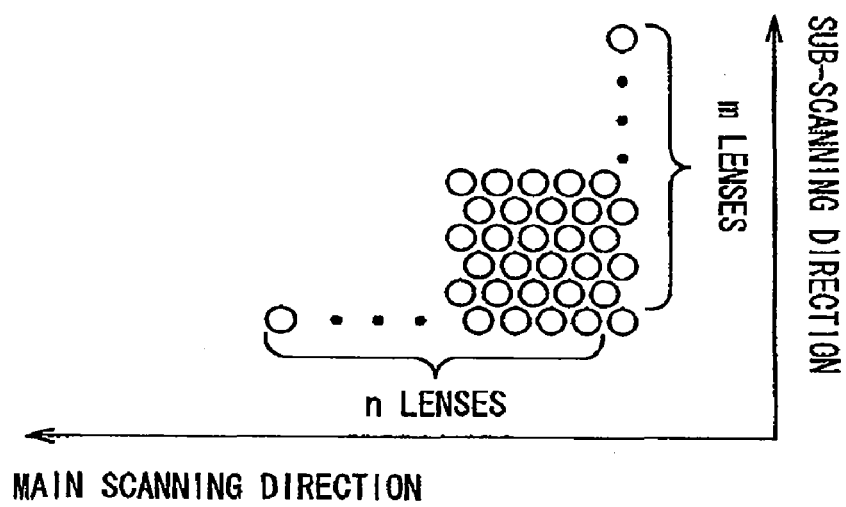
FIG. 21 is a diagram of an array of a lens group included in the erect equal-magnification lens array.
Figure 22:
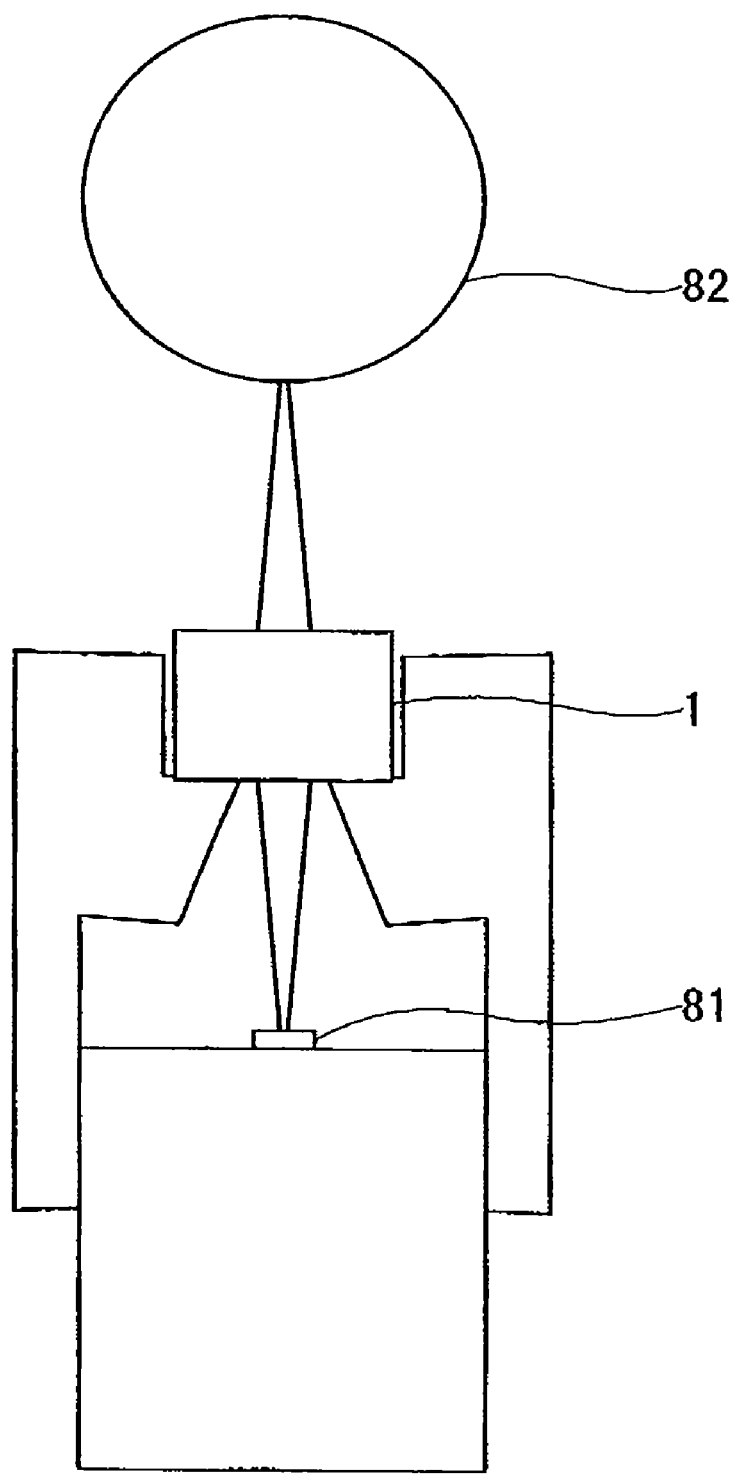
FIG. 22 is a sectional view of the erect equal-magnification lens array according to the embodiment mounted on an exposing optical system.

FIG. 20 is a sectional view of a CIS (Contact Image Sensor) in which the erect equal-magnification lens array 1 according to this embodiment is mounted on a scanner scanning optical system. As shown in FIG. 20, a light source is an LED 51. The LED 51 illuminates an original document placed on a glass surface 50. The erect equal-magnification lens array 1 condenses reflected light from the original document on a CCD sensor surface 53. When the LED 51 is sequentially lit as three primary colors R, G, and B, the reading optical system can be a color scanning optical system. FIG. 21 is a diagram of an array of a group of lenses included in the erect equal-magnification lens array 1. As shown in FIG. 21, the group of lenses included in the erect equal-magnification lens array 1 are arrayed, for example, in n rows in a main scanning direction and m columns in a sub-scanning direction on each of the lens array plates. FIG. 22 is a sectional view of the erect equal-magnification lens array 1 according to this embodiment mounted on an exposing optical system. As shown in FIG. 22, the erect equal-magnification lens array 1 focuses light from an LED 81 as a light source on a photoconductive drum 82 as a scanning object.

The erect equal-magnification lens array 1 according to this embodiment includes: a first lens array plate including a first lens plate having a planar shape and a group of plural convex lenses arrayed on an emission surface of the first lens plate from which a beam is emitted, an incident surface of the first lens plate on which the beam is made incident being formed in a planar shape; a first aperture plate having plural apertures corresponding to plural projections of the plural convex lenses of the first lens array plate; a second lens array plate including a second lens plate having a planar shape and a group of plural convex lenses arrayed on both an incident surface of the second lens plate on which a beam is made incident and an emission surface of the second lens plate from which the beam is emitted; a second aperture plate including plural apertures corresponding to plural projections of the plural convex lenses on the emission surface of the second lens plate from which the beam is emitted; and a third lens array plate including a third lens plate having a planar shape and a group of plural convex lenses arrayed on an incident surface of the third lens plate on which a beam is made incident.

Since the incident surface of the first lens array plate 12 is formed in the planar shape, the erect equal-magnification lens array 1 according to this embodiment has different shapes of the incident surface and the emission surface. The erect equal-magnification lens array 1 according to this embodiment includes the first aperture plate 13, which has the cylindrical apertures, between the first lens array plate 12 and the second lens array plate 14. Therefore, a beam after passing through the emission surface having power can be prevented from being made incident on the lens surfaces of the second lens array plate 14 on adjacent optical paths. An MTF can be prevented from being deteriorated by stray light. The erect equal-magnification lens array 1 according to this embodiment includes the second aperture plate 15, which has the cylindrical apertures, between the second lens array plate 14 and the third lens array plate 16, the emission surface of which is formed as the plane. Therefore, a beam after passing through the emission surface of the second lens array plate 14 having power can be prevented from being made incident on the lens surfaces of the third lens array plate 16 on adjacent optical paths. Light after being made incident on the third lens array plate 16 does not thereafter pass through a surface having power. There is no adjacent lens surface of the emission surface having power. Therefore, an MTF can be prevented from being deteriorated by stray light. In the erect equal-emission lens array 1 according to this embodiment, it is unnecessary to insert a thick aperture plate on the incident surface side of the first lens array 12 in order to reduce stray light. Light obliquely made incident on the first, lens array plate 12 is not blocked. Therefore, an amount of light made incident on the first lens array plate 12 can be prevented from decreasing.

The distal ends of the first lens array plate 12 and the third lens array plate 16 are set in the conjugate relation with respect to the second lens array. Therefore, even if an object point moves to an end of an effective area, a beam can be prevented from being eclipsed by the aperture plates. An amount of light can be prevented from being reduced even if the object point moves to the end of the effective area. A change in the amount of light can be suppressed.

Figure 23:
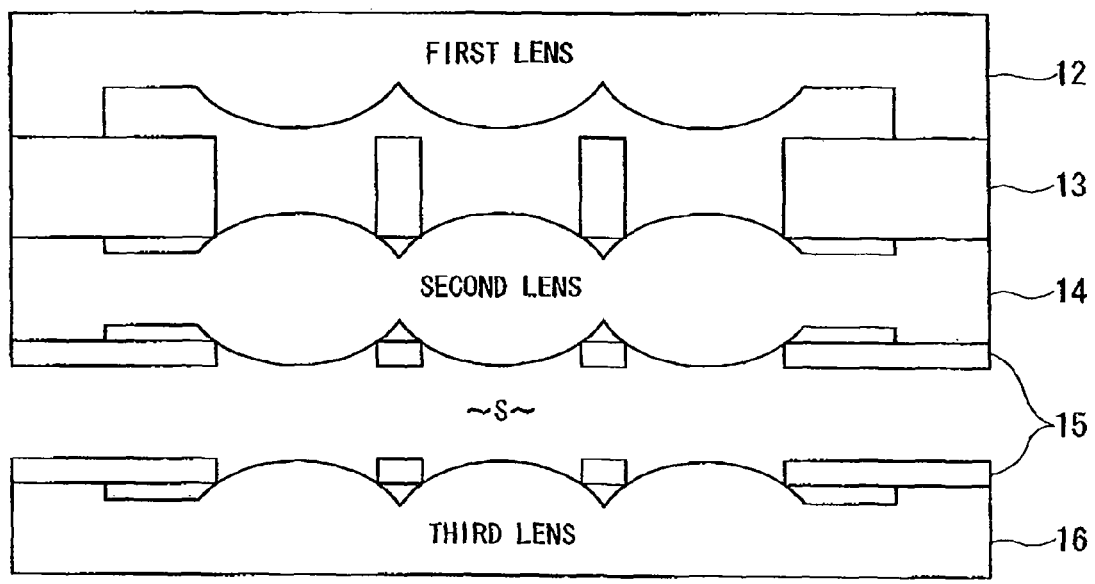
FIG. 23 is a diagram of another state in which a part of the erect equal-magnification lens array according to the embodiment is extracted.

FIG. 23 is a diagram of another state in which a part of the erect equal-magnification lens array 1 according to this embodiment is extracted. As shown in FIG. 23, the second aperture plate 15 provided between the second lens array plate 14 and the third lens array plate 16 may include a spacer S in the center section other than a frame section of the second aperture plate 15.

What is claimed is:

1. An erect equal-magnification lens array comprising:
a first lens array plate including a first lens plate and a group of plural convex lenses arrayed on an emission surface of the first lens plate from which a beam is emitted, an incident surface of the first lens plate on which the beam is made incident being formed in a planar shape;
a first aperture plate having plural apertures corresponding to plural projections of the plural convex lenses of the first lens array plate;
a second lens array plate including a second lens plate and a group of plural convex lenses arrayed on both an incident surface of the second lens plate on which a beam is made incident and an emission surface of the second lens plate from which the beam is emitted;
a second aperture plate including plural apertures corresponding to plural projections of the plural convex lenses on the emission surface of the second lens plate from which the beam is emitted; and
a third lens array plate including a third lens plate and a group of plural convex lenses arrayed on an incident surface of the third lens plate on which a beam is made incident.

2. The lens array according to claim 1, wherein apertures of the first aperture plate are concentric with circles formed by crossing lines of projections of the convex lenses of the first lens array plate and the first lens plate and have an aperture radius substantially the same as that of the circles.

3. The lens array according to claim 1, wherein the second lens array plate includes, in positions opposed to projections of the convex lenses arrayed on the emission surface of the first lens array plate from which the beam is emitted, projections of the convex lenses arrayed on the incident surface of the second lens plate on which the beam is made incident.

4. The lens array according to claim 3, wherein circles formed by crossing lines of projections of the convex lenses arrayed on the incident surface of the second lens array plate on which the beam is made incident and the second lens plate are concentric with circles formed by crossing lines of the projections of the convex lenses arrayed on the emission surface of the first lens array plate from which the beam is emitted and the first lens plate and have a radius, an absolute value of which is substantially the same as that of the circles.

5. The lens array according to claim 1, wherein apertures of the second aperture plate are concentric with circles formed by crossing lines of projections of the convex lenses arrayed on the emission surface of the second lens array plate from which the beam is emitted and the second lens plate and have an aperture radius substantially the same as that of the circles.

6. The lens array according to claim 1, wherein the third lens array plate includes, in positions opposed to projections of the convex lenses arrayed on the emission surface of the second lens array plate from which the beam is emitted, projections of the convex lenses arrayed on the incident surface of the third lens plate on which the beam is made incident.

7. The lens array according to claim 1, wherein a distal end of the first lens array plate and a distal end of the third lens array plate have a conjugate relation with respect to the second lens array plate.

8. The lens array according to claim 1, wherein
the first lens array plate, the second lens array plate, and the third lens array plate respectively have plural fit-in projections, and
the first aperture plate and the second aperture plate respectively have plural fit-in holes or fit-in recesses.

9. The lens array according to claim 1, wherein a shape of the convex lenses of the first lens array plate, the second lens array plate, and the third lens array plate is a spherical shape or an aspherical shape.

10. The lens array according to claim 1, wherein the components included in the erect equal-magnification lens array are positioned by an adhesive.

11. The lens array according to claim 1, wherein the components included in the erect equal-magnification lens array respectively include plural positioning pin holes and are positioned by pins.

12. The lens array according to claim 1, further comprising a pair of pressing plates which press the components included in the erect equal-magnification lens array.

13. The lens array according to claim 12, wherein
the pair of pressing plates respectively include plural positioning pin holes, and
the components included in the erect equal-magnification lens array together with the pair of pressing plates are positioned by pins.

14. The lens array according to claim 1, wherein the erect equal-magnification lens array is an erect equal-magnification lens array of a scanning optical system.

15. The lens array according to claim 1, wherein the erect equal-magnification lens array is an erect equal-magnification lens array of an exposing optical system.

16. A scanning optical system comprising an erect equal-magnification lens array, wherein
the erect equal-magnification lens array includes:
a first lens array plate including a first lens plate and a group of plural convex lenses arrayed on an emission surface of the first lens plate from which a beam is emitted, an incident surface of the first lens plate on which the beam is made incident being formed in a planar shape;
a first aperture plate having plural apertures corresponding to plural projections of the plural convex lenses of the first lens array plate;
a second lens array plate including a second lens plate and a group of plural convex lenses arrayed on both an incident surface of the second lens plate on which a beam is made incident and an emission surface of the second lens plate from which the beam is emitted;
a second aperture plate including plural apertures corresponding to plural projections of the plural convex lenses on the emission surface of the second lens plate from which the beam is emitted; and
a third lens array plate including a third lens plate and a group of plural convex lenses arrayed on an incident surface of the third lens plate on which a beam is made incident.

17. An exposing optical system comprising an erect equal-magnification lens array, wherein
the erect equal-magnification lens array includes:
a first lens array plate including a first lens plate and a group of plural convex lenses arrayed on an emission surface of the first lens plate from which a beam is emitted, an incident surface of the first lens plate on which the beam is made incident being formed in a planar shape;
a first aperture plate having plural apertures corresponding to plural projections of the plural convex lenses of the first lens array plate;
a second lens array plate including a second lens plate and a group of plural convex lenses arrayed on both an incident surface of the second lens plate on which a beam is made incident and an emission surface of the second lens plate from which the beam is emitted;
a second aperture plate including plural apertures corresponding to plural projections of the plural convex lenses on the emission surface of the second lens plate from which the beam is emitted; and
a third lens array plate including a third lens plate and a group of plural convex lenses arrayed on an incident surface of the third lens plate on which a beam is made incident.

18. An image forming apparatus comprising an erect equal-magnification lens array, wherein
the erect equal-magnification lens array includes:
a first lens array plate including a first lens plate and a group of plural convex lenses arrayed on an emission surface of the first lens plate from which a beam is emitted, an incident surface of the first lens plate on which the beam is made incident being formed in a planar shape;
a first aperture plate having plural apertures corresponding to plural projections of the plural convex lenses of the first lens array plate;
a second lens array plate including a second lens plate and a group of plural convex lenses arrayed on both an incident surface of the second lens plate on which a beam is made incident and an emission surface of the second lens plate from which the beam is emitted;
a second aperture plate including plural apertures corresponding to plural projections of the plural convex lenses on the emission surface of the second lens plate from which the beam is emitted; and
a third lens array plate including a third lens plate and a group of plural convex lenses arrayed on an incident surface of the third lens plate on which a beam is made incident.

* * * * *